United States Patent
Du et al.

(10) Patent No.: US 12,219,041 B2
(45) Date of Patent: Feb. 4, 2025

(54) DATA TRANSMISSION METHOD, NETWORK NODE, AND STORAGE MEDIUM

(71) Applicant: HUAWEI TECHNOLOGIES CO., LTD., Guangdong (CN)

(72) Inventors: Zongpeng Du, Shenzhen (CN); Jie Dong, Beijing (CN); Xiaodong Chang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 265 days.

(21) Appl. No.: 17/573,094

(22) Filed: Jan. 11, 2022

(65) Prior Publication Data

US 2022/0131791 A1 Apr. 28, 2022

Related U.S. Application Data

(63) Continuation of application No. PCT/CN2020/101672, filed on Jul. 13, 2020.

(30) Foreign Application Priority Data

Jul. 12, 2019 (CN) .......................... 201910631947.5

(51) Int. Cl.
*H04L 45/00* (2022.01)
*H04L 69/325* (2022.01)
*H04L 45/243* (2022.01)

(52) U.S. Cl.
CPC ............ *H04L 69/325* (2013.01); *H04L 45/22* (2013.01); *H04L 45/34* (2013.01); *H04L 45/243* (2022.05)

(58) Field of Classification Search
None
See application file for complete search history.

(56) References Cited

U.S. PATENT DOCUMENTS 10,601,724 B1 * 3/2020 Filsfils .................... H04L 47/70
2016/0006614 A1 1/2016 Zhao
(Continued)

FOREIGN PATENT DOCUMENTS

CN 101588296 A 11/2009
CN 101610214 A 12/2009
(Continued)

OTHER PUBLICATIONS

C. Filsfils et al.,"SRv6 Network Programming draft-filsfils-spring-srv6-network-programming-05",Jul. 2, 2018,total:53pages.
(Continued)

*Primary Examiner* — Xavier S Wong
(74) *Attorney, Agent, or Firm* — WOMBLE BOND DICKINSON (US) LLP

(57) ABSTRACT

This application describes a data transmission method, a network node, and a storage medium for communications technologies. In this application, an underlay segment identifier corresponding to an underlay path is designed, and the underlay segment identifier is advertised, so that a node on a segment routing network can sense the underlay path by using the underlay segment identifier. In this way, when a data packet is transmitted, the data packet can be sent based on an underlay segment identifier carried in the data packet and through an underlay path corresponding to the underlay segment identifier. Therefore, an underlay path through which a data packet is to be transmitted may be specified based on a service requirement, so that different data packets can be transmitted through different underlay paths, thereby improving flexibility and facilitating traffic planning.

18 Claims, 16 Drawing Sheets

(56) References Cited

U.S. PATENT DOCUMENTS

| | | | |
|---|---|---|---|
| 2016/0021000 A1 | 1/2016 | Previdi et al. | |
| 2018/0302321 A1* | 10/2018 | Manthiramoorthy | ........................ H04L 12/4641 |
| 2018/0375763 A1 | 12/2018 | Brissette et al. | |
| 2019/0372858 A1* | 12/2019 | Krishnamurthy | ..... H04L 41/145 |
| 2020/0145321 A1* | 5/2020 | Pignataro | ................ H04L 45/64 |
| 2022/0052945 A1* | 2/2022 | Peng | ................... H04L 12/4633 |
| 2022/0103462 A1* | 3/2022 | Sidebottom et al. | ... H04L 45/34 |

FOREIGN PATENT DOCUMENTS

| | | |
|---|---|---|
| CN | 101656666 A | 2/2010 |
| CN | 105591893 A | 5/2016 |
| CN | 108023815 A | 5/2018 |
| CN | 108512702 A | 9/2018 |
| CN | 108702328 A | 10/2018 |
| CN | 109873767 A | 6/2019 |
| EP | 2341668 A1 | 7/2011 |
| WO | 2017141079 A1 | 8/2017 |
| WO | 2018082652 A1 | 5/2018 |

OTHER PUBLICATIONS

P. Psenak, Ed et al.,"IS-IS Extensions to Support Routing over IPv6 Dataplane draft-bashandy-isis-srv6-extensions-04.txt",Oct. 15, 2018,total:21pages.

Madhukar Anand et al., "Packet-Optical Integration in Segment Routing draft-anand-spring-poi-sr-07", Jan. 28, 2019, total:17pages.

G. Dawra, Ed et al.,"BGP Link State Extensions for SRv6 draft-dawra-idr-bgpls-srv6-ext-06",Mar. 24, 2019, total:24pages.

T. Przygienda et al.,"M-ISIS: Multi Topology (MT) Routing in Intermediate System to Intermediate Systems (IS-ISs)", Feb. 2008,total:14pages.

T. Li et al.,"IS-IS Extensions for Traffic Engineering",Oct. 2008,total:17pages.

* cited by examiner

| Type (Type) | Length (Length) | |
|---|---|---|
| Flag (Flags) | Algorithm (algorithm) | Weight (weight) |
| SRv6 endpoint function (SRv6 Endpoint Function) | | |
| SID (128 bits) |||
| SID (continuation) |||
| SID (continuation) |||
| SID (continuation) |||
| Sub-sub-TLV (variable-length) | One or more sub-sub-TLVs (variable) ||

FIG. 5

| Type (Type) | Length (Length) | System ID (System ID) |
|---|---|---|
| Flag (Flags) | Algorithm (algorithm) | Weight (weight) |
| SRv6 endpoint function (SRv6 Endpoint Function) | | |
| SID (128 bits) | | |
| SID (continuation) | | |
| SID (continuation) | | |
| SID (continuation) | | |
| Sub-sub-TLV (variable-length) | One or more sub-sub-TLVs (variable) | |

FIG. 6

| Type (Type) | Length (Length) | Flag (Flags) | Algorithm (algorithm) |
|---|---|---|---|
| Weight (weight) | SRv6 endpoint function (SRv6 Endpoint Function) | | Underlay path type (underlay type) |
| SID (128 bits) | | | |
| SID (continuation) | | | |
| SID (continuation) | | | |
| SID (continuation) | | | |
| Sub-sub-sub-TLV (variable-length) | One or more sub-sub-sub-TLVs (variable) | | |

FIG. 7

| Type (Type) | Length (Length) | Flag (Flags) | Algorithm (algorithm) |
|---|---|---|---|
| Weight (weight) | SRv6 endpoint function || Underlay path type (underlay type) |
| SID (128 bits) ||||
| SID (continuation) ||||
| SID (continuation) ||||
| SID (continuation) ||||
| Sub-sub-TLV (variable-length) | One or more sub-sub-TLVs (variable) |||

FIG. 8

| Type (Type) | Length (Length) | |
|---|---|---|
| System ID (System ID) ||||
| Flag (Flags) | Algorithm (algorithm) | Weight (weight) |
| SRv6 endpoint function (SRv6 Endpoint Function) || Underlay path type (underlay type) |
| SID (128 bits) |||
| SID (continuation) |||
| SID (continuation) |||
| SID (continuation) |||
| Sub-sub-TLV (variable-length) | One or more sub-sub-TLVs (variable) ||

FIG. 9

| Type<br>(Type) | Length<br>(Length) | Algorithm<br>(algorithm) | Weight<br>(weight) |
|---|---|---|---|
| Flag<br>(Flags) | SRv6 endpoint function<br>(SRv6 Endpoint Function) | | Underlay path type<br>(underlay type) |
| SID (128 bits) | | | |
| SID (continuation) | | | |
| SID (continuation) | | | |
| SID (continuation) | | | |
| Sub-sub-TLV<br>(variable-length) | One or more sub-TLVs<br>(variable) | | |

FIG. 11

| Type (Type) | Length (Length) |
|---|---|

| System ID (System ID) |
|---|

| Flag (Flags) | Algorithm (algorithm) | Weight (weight) |
|---|---|---|

| SRv6 endpoint function (SRv6 Endpoint Function) | Underlay path type (underlay type) |
|---|---|

| SID (128 bits) |
|---|
| SID (continuation) |
| SID (continuation) |
| SID (continuation) |

| Sub-sub-TLV (variable-length) | One or more sub-sub-TLVs (variable) |
|---|---|

FIG. 12

| Type (Type) | Length (Length) | | |
|---|---|---|---|
| SRv6 endpoint function (SRv6 Endpoint Function) | Underlay path type (underlay type) | Flag (Flags) | Algorithm (algorithm) |
| Weight (weight) | SID (16 bytes) | | |
| SID (continuation) | | | |
| SID (continuation) | | | |
| SID (continuation) | | | |
| SID (continuation) | One or more sub-TLVs (variable) | | |

FIG. 14

| Type (Type) | | Length (Length) | |
|---|---|---|---|
| SRv6 endpoint function (SRv6 Endpoint Function) | Underlay path type (underlay type) | Flag (Flags) | Algorithm (algorithm) |
| Weight (weight) | Reserved | IS-IS system ID (System ID, 6 bytes) | |
| or a router ID (4 bytes) of a neighboring node in OSPFv3 | | | |
| SID (16 bytes) | | | |
| SID (continuation) | | | |
| SID (continuation) | | | |
| SID (continuation) | | | |
| One or more sub-TLVs (variable) | | | |

FIG. 15

DATA TRANSMISSION METHOD, NETWORK NODE, AND STORAGE MEDIUM

CROSS-REFERENCE TO RELATED APPLICATIONS

This application is a continuation of International Application No. PCT/CN2020/101672, filed on Jul. 13, 2020, which claims priority to Chinese Patent Application No. 201910631947.5, filed on Jul. 12, 2019. The disclosures of the aforementioned applications are hereby incorporated by reference in their entireties.

TECHNICAL FIELD

This application relates to the field of communications technologies, and in particular, to a data transmission method, a network node, and a storage medium.

BACKGROUND

Segment routing (SR) is a protocol designed based on an idea of source routing to forward data packets on a network. SR divides a network path into segments and allocates segment identifiers (SID) to the segments or nodes. Sequentially arranged segment identifiers are added to data packets, so that the data packets can be transmitted through forwarding paths indicated by the segment identifiers. Internet protocol version 6 (IPv6)-based segment routing (SRv6) combines the SR technology with the IPv6 protocol, encodes a SID as an IPv6 address by using an IPv6 data plane, and implements a function of SR based on an IPv6 forwarding plane.

In a related technology, different nodes on an SRv6 network may be connected to each other through an internet protocol (IP) layer link. For any node, the node may advertise at least one endpoint layer 3 cross-connect segment identifier (referred to herein as End.X SID, where End stands for endpoint, which indicates an endpoint; X stands for crossing, which indicates layer 3 cross-connect; and SID indicates a segment identifier). Each End.X SID is used to identify an IP layer link directly connected to the node. Other nodes on the network may determine, by receiving End.X SIDs advertised by each other, a SID corresponding to each IP layer link on the network. When a data packet enters the SRv6 network, a head node receives the data packet, and determines a forwarding path of the data packet. Then, in a possible implementation, the head node may obtain, based on each IP layer link that the forwarding path needs to pass, an End.X SID corresponding to each IP layer link, write the obtained End.X SID into the data packet, and send the data packet carrying the End.X SID to a next node. When any node receives the data packet, the node parses the data packet to obtain the End.X SID carried in the data packet, and sends the data packet through an IP layer outbound interface bound to the End.X SID. Then the data packet passes through an IP layer link corresponding to the IP layer outbound interface and arrives at a next node. The next node continues to forward the data packet by performing similar steps until the data packet arrives at a destination node. In another possible implementation, the head node may obtain, based on each node that the forwarding path needs to pass, an endpoint segment identifier (referred to herein as End SID, where End stands for endpoint, which indicates an endpoint; and SID indicates a segment identifier) corresponding to each node, write the obtained End SID into the data packet, and send the data packet carrying the End SID to a next node. When any node receives the data packet, the node parses the data packet to obtain the End SID carried in the data packet, and sends the data packet to a node corresponding to the End SID. Then the data packet arrives at the node corresponding to the End SID. By analogy, each node continues to forward the data packet by performing similar steps until the data packet arrives at a destination node. It should be noted that a SID list including the END.X SID or the END SID may specify only some nodes on the path but not all nodes. Alternatively, the END.X, the END, and other SRv6 functions may be used in combination.

Currently, a node on the SRv6 network can sense only an IP layer link but not an underlay path. Therefore, even if different nodes are connected to each other through a plurality of underlay paths, a node can transmit a data packet only through a preconfigured underlay path. As a result, an underlay path for transmitting a data packet cannot be controlled based on a service requirement, resulting in poor flexibility.

SUMMARY

This application provides a data transmission method, a network node, and a storage medium, so that a node on a segment routing network can sense an underlay path, thereby improving flexibility for transmitting a data packet. The technical solutions are as follows.

According to a first aspect, a data transmission method is provided. The method is used for a first network node. The first network node is connected to a second network node through at least one underlay path. The underlay path is a data link layer path, a physical layer path, or a path constructed by using a tunneling technology. The method includes: advertising at least one underlay segment identifier, where each underlay segment identifier corresponds to one or more of the at least one underlay path; receiving a data packet carrying a target underlay segment identifier; and sending the data packet through an underlay path, corresponding to the target underlay segment identifier, of the at least one underlay path, where the target underlay segment identifier is any one of the at least one underlay segment identifier.

An underlay segment identifier corresponding to an underlay path is designed, and the underlay segment identifier is advertised, so that a node on a segment routing network can sense the underlay path by using the underlay segment identifier. In this way, when a data packet is transmitted, the data packet can be sent based on an underlay segment identifier carried in the data packet and through an underlay path corresponding to the underlay segment identifier. Therefore, an underlay path through which a data packet is to be transmitted may be specified based on a service requirement, so that different data packets can be transmitted through different underlay paths, thereby improving flexibility for transmitting a data packet and facilitating traffic planning. Particularly, when the underlay path is an optical path, by advertising the underlay segment identifier, the node on the SRv6 network can sense each optical path by using the underlay segment identifier, so that a POI scenario is supported, and an optical path for transmitting traffic can be flexibly selected as required.

Optionally, one or more of the at least one underlay segment identifier is an underlay link segment identifier.

Optionally, the one or more of the at least one underlay path is an optical path, an asynchronous transfer mode (ATM) path, a frame relay (FR) path, a back-to-back Ethernet path, a generic routing encapsulation (GRE) tunnel, a flexible Ethernet (e.g., Flex Ethernet, FlexE, or the like) path, a multiprotocol label switching resource reservation protocol-traffic engineering (MPLS RSVP-TE) tunnel, an IP tunnel, or a user datagram protocol (UDP) tunnel.

Optionally, the optical path is a dense wavelength division multiplexing (DWDM) path or an optical transport network (OTN) path.

Optionally, the advertising at least one underlay segment identifier includes: advertising at least two underlay segment identifiers. The at least two underlay segment identifiers correspond to one endpoint layer 3 cross-connect segment identifier (e.g., End.X SID). The endpoint layer 3 cross-connect segment identifier is used to identify a layer 3 adjacency between the first network node and the second network node.

In this optional manner, because an End.X SID identifies a layer 3 adjacency between two network nodes, if one End.X SID corresponds to at least two underlay segment identifiers, it indicates that an adjacency between two network nodes is provided by using at least two underlay paths. In this scenario, by advertising the at least two underlay segment identifiers and adding an underlay segment identifier to a data packet, an underlay path, through which the data packet is to be transmitted, of the at least two underlay paths may be specified, so that each underlay path can be flexibly scheduled, and different transmission policies are performed for different traffic, thereby extending a data transmission capability and improving flexibility.

Optionally, the one or more of the at least one underlay segment identifier has no corresponding endpoint layer 3 cross-connect segment identifier, and the endpoint layer 3 cross-connect segment identifier is used to identify a layer 3 adjacency between the first network node and the second network node.

In this optional manner, because an End.X SID identifies a layer 3 adjacency between two network nodes, if an underlay segment identifier has no corresponding End.X SID, it indicates that no adjacency is established between two network nodes at an IP layer. In this scenario, by advertising an underlay segment identifier and adding the underlay segment identifier to a data packet, the data packet can also be transmitted through an underlay path corresponding to the underlay segment identifier. In this case, the underlay path can be scheduled by using the underlay segment identifier even if an IP layer path between the two network nodes is unknown, thereby extending a data transmission capability and improving flexibility.

Optionally, the advertising at least one underlay segment identifier includes: advertising the at least one underlay segment identifier by using an interior gateway protocol (IGP); or advertising the at least one underlay segment identifier by using a border gateway protocol-link state (BGP-LS); or advertising the at least one underlay segment identifier by using a path computation element communication protocol (PCEP).

Optionally, the method further includes: advertising a path parameter of the one or more of the at least one underlay path.

The path parameter of the underlay path is advertised, so that a head node or a controller can select, based on the path parameter, an underlay path for transmitting the data packet.

Optionally, the method further includes: advertising an identifier of the second network node.

The identifier of the second network node is advertised, so that the head node or the controller can determine a peer node of an underlay path based on the identifier of the second network node, to sense a network node to which the first network node is connected through the underlay path.

Optionally, the method further includes: advertising a path type of the one or more of the at least one underlay path.

A path type of each underlay path is advertised, so that the head node or the controller can sense a specific type of an advertised underlay path, and can schedule, based on a service requirement, a specific type of underlay path for data transmission, thereby improving flexibility.

Optionally, the at least one underlay segment identifier is carried in a packet, the packet includes at least one first type-length-value (TLV), and each first TLV includes one underlay segment identifier.

Optionally, the first TLV is a sub-TLV of a second TLV, and the second TLV includes the endpoint layer 3 cross-connect segment identifier (referred to herein as End.X SID, where End stands for endpoint, which indicates an endpoint; X stands for crossing, which indicates layer 3 cross-connect; and SID indicates a segment identifier); or the first TLV is a TLV parallel to the second TLV; or the first TLV is a sub-TLV of a locator TLV; or the first TLV is a sub-TLV of a new top TLV, and the top TLV is a TLV not nested in another TLV.

In the foregoing optional manner, multiple packet formats are provided for advertising an underlay segment identifier, thereby improving flexibility.

Optionally, the new top TLV or the locator TLV includes an endpoint layer 3 cross-connect segment identifier of the first network node.

The endpoint layer 3 cross-connect segment identifier of the first network node is usually advertised by using a 22 TLV or a 222 TLV. In the foregoing optional manner, the endpoint layer 3 cross-connect segment identifier of the first network node is also advertised by using the new top TLV or the locator TLV. Therefore, the 22 TLV or the 222 TLV may not need to carry a segment identifier related to a neighboring node, thereby reducing complexity of the 22 TLV or the 222 TLV.

Optionally, before the advertising at least one underlay segment identifier, the method further includes: allocating the at least one underlay segment identifier to the at least one underlay path; or receiving a configuration instruction, and obtaining, from the configuration instruction, a correspondence between the at least one underlay segment identifier and the one or more of the at least one underlay path.

Optionally, the method further includes: storing a binding relationship between an underlay segment identifier and an underlay outbound interface; and the sending the data packet through an underlay path, corresponding to the target underlay segment identifier, of the at least one underlay path includes: determining, based on the target underlay segment identifier and the binding relationship, an underlay outbound interface bound to the target underlay segment identifier, and sending the data packet through the underlay outbound interface.

According to a second aspect, a data transmission method is provided. The method is used for a head node. The head node is a node at an ingress of a segment routing network. The method includes: receiving at least one underlay segment identifier from a first network node, where the first network node is connected to a second network node through at least one underlay path, the underlay path is a data link layer path, a physical layer path, or a path constructed by using a tunneling technology, and each underlay segment identifier corresponds to one or more of the at least one underlay path; receiving a data packet; adding a target underlay segment identifier to the data packet, where the target underlay segment identifier is any one of the at least one underlay segment identifier; and sending the data packet carrying the target underlay segment identifier to the first network node.

An underlay segment identifier corresponding to an underlay path is designed, and a target underlay segment identifier is added to a data packet when the data packet is transmitted, so that the first network node can send the data packet based on the underlay segment identifier carried in the data packet and through an underlay path corresponding to the underlay segment identifier. Therefore, an underlay path through which a data packet is to be transmitted may be specified based on a service requirement, so that different data packets can be transmitted through different underlay paths, thereby improving flexibility for transmitting a data packet and facilitating traffic planning.

Optionally, one or more of the at least one underlay segment identifier is an underlay link segment identifier.

Optionally, the one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, before the adding a target underlay segment identifier to the data packet, the method further includes: selecting, from the at least one underlay path based on a service carried in the data packet, an underlay path corresponding to the service, and using an underlay segment identifier corresponding to the selected underlay path as the target underlay segment identifier; or receiving the target underlay segment identifier from a controller of the segment routing network, and adding the target underlay segment identifier to the data packet.

An underlay path for transmitting a data packet is selected based on a service carried in the data packet. For any service, an underlay path through which a data packet carrying the service is to pass may be specified, so that different services can be transmitted through different underlay paths to facilitate traffic planning, and different underlay paths can be better utilized to improve quality of service (QoS) of a service.

Optionally, the selecting, from the at least one underlay path, an underlay path corresponding to the service includes: selecting, from the at least one underlay path based on a path parameter of each underlay path, an underlay path whose path parameter meets a transmission requirement of the service.

Optionally, before the selecting, from the at least one underlay path based on a path parameter of each underlay path, an underlay path whose path parameter meets a transmission requirement of the service, the method further includes: receiving a path parameter of the one or more of the at least one underlay path from the first network node.

Optionally, the method further includes: receiving an identifier of the second network node from the first network node.

Optionally, the method further includes: receiving a path type of the one or more of the at least one underlay path from the first network node.

According to a third aspect, a first network node is provided. The first network node has a function of implementing the data transmission method in any one of the first aspect or the optional manners of the first aspect. The apparatus includes at least one module. The at least one module is configured to implement the data transmission method provided in any one of the first aspect or the optional manners of the first aspect.

According to a fourth aspect, a head node is provided. The head node has a function of implementing the data transmission method in any one of the second aspect or the optional manners of the second aspect. The apparatus includes at least one module. The at least one module is configured to implement the data transmission method provided in any one of the second aspect or the optional manners of the second aspect.

According to a fifth aspect, a first network node is provided. The first network node includes a processor, a memory, and a transceiver. The memory stores at least one instruction.

The processor is configured to load the instruction to control the transceiver to advertise at least one underlay segment identifier. Each underlay segment identifier corresponds to one or more of at least one underlay path. The processor is further configured to control, by using the instruction, the transceiver to receive a data packet carrying a target underlay segment identifier. The processor is further configured to control, by using the instruction, the transceiver to send the data packet through an underlay path, corresponding to the target underlay segment identifier, of the at least one underlay path. The target underlay segment identifier is any one of the at least one underlay segment identifier.

Optionally, one or more of the at least one underlay segment identifier is an underlay link segment identifier.

Optionally, the one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processor is further configured to control, by using the instruction, the transceiver to advertise a path parameter of the one or more of the at least one underlay path.

Optionally, the processor is further configured to control, by using the instruction, the transceiver to advertise an identifier of a second network node.

Optionally, the processor is further configured to control, by using the instruction, the transceiver to advertise a path type of the one or more of the at least one underlay path.

Optionally, the at least one underlay segment identifier is carried in a packet, the packet includes at least one first type-length-value TLV, and each first TLV includes one underlay segment identifier.

Optionally, the first TLV is a sub-TLV of a second TLV, and the second TLV includes the endpoint layer 3 cross-connect segment identifier; or the first TLV is a TLV parallel to the second TLV; or the first TLV is a sub-TLV of a locator TLV; or the first TLV is a sub-TLV of a new top TLV, and the top TLV is a TLV not nested in another TLV.

Optionally, the processor is configured to allocate, by using the instruction, the at least one underlay segment identifier to the at least one underlay path; or the processor is further configured to control, by using the instruction, the transceiver to receive a configuration instruction, and obtain, from the configuration instruction, a correspondence between the at least one underlay segment identifier and the one or more of the at least one underlay path.

Optionally, the processor is further configured to control, by using the instruction, the memory to store a binding relationship between an underlay segment identifier and an underlay outbound interface. The processor is further configured to determine, by using the instruction and based on the target underlay segment identifier and the binding relationship, an underlay outbound interface bound to the target underlay segment identifier. The processor is configured to control, by using the instruction, the transceiver to send the data packet through the underlay outbound interface.

According to a sixth aspect, a head node is provided. The head node includes a processor, a memory, and a transceiver. The memory stores at least one instruction.

The processor is configured to load the instruction to control the transceiver to receive at least one underlay segment identifier from a first network node. The first network node is connected to a second network node through at least one underlay path. The underlay path is a data link layer path, a physical layer path, or a path constructed by using a tunneling technology. Each underlay segment identifier corresponds to one or more of the at least one underlay path.

The processor is further configured to control, by using the instruction, the transceiver to receive a data packet.

The processor is further configured to add, by using the instruction, a target underlay segment identifier to the data packet. The target underlay segment identifier is any one of the at least one underlay segment identifier.

The processor is further configured to control, by using the instruction, the transceiver to send the data packet carrying the target underlay segment identifier to the first network node.

Optionally, one or more of the at least one underlay segment identifier is an underlay link segment identifier.

Optionally, the one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processor is further configured to select, by using the instruction from the at least one underlay path based on a service carried in the data packet, an underlay path corresponding to the service, and use an underlay segment identifier corresponding to the selected underlay path as the target underlay segment identifier; or the processor is further configured to control, by using the instruction, the transceiver to receive the target underlay segment identifier from a controller of the segment routing network.

Optionally, the processor is specifically configured to select, by using the instruction from the at least one underlay path based on a path parameter of each underlay path, an underlay path whose path parameter meets a transmission requirement of the service.

Optionally, the processor is further configured to control, by using the instruction, the transceiver to receive a path parameter of the one or more of the at least one underlay path from the first network node.

Optionally, the processor is further configured to control, by using the instruction, the transceiver to receive an identifier of the second network node from the first network node.

Optionally, the processor is further configured to control, by using the instruction, the transceiver to receive a path type of the one or more of the at least one underlay path.

According to a seventh aspect, a computer-readable storage medium is provided. The storage medium stores at least one instruction.

The instruction is used for loading by a processor to control a transceiver to advertise at least one underlay segment identifier. Each underlay segment identifier corresponds to one or more of at least one underlay path. The instruction is further used by the processor to control the transceiver to receive a data packet carrying a target underlay segment identifier. The instruction is further used by the processor to control the transceiver to send the data packet through an underlay path, corresponding to the target underlay segment identifier, of the at least one underlay path. The target underlay segment identifier is any one of the at least one underlay segment identifier.

Optionally, one or more of the at least one underlay segment identifier is an underlay link segment identifier.

Optionally, the one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the instruction is further used by the processor to control the transceiver to advertise a path parameter of the one or more of the at least one underlay path.

Optionally, the instruction is further used by the processor to control the transceiver to advertise an identifier of a second network node.

Optionally, the instruction is further used by the processor to control the transceiver to advertise a path type of the one or more of the at least one underlay path.

Optionally, the at least one underlay segment identifier is carried in a packet, the packet includes at least one first type-length-value TLV, and each first TLV includes one underlay segment identifier.

Optionally, the first TLV is a sub-TLV of a second TLV, and the second TLV includes the endpoint layer 3 cross-connect segment identifier; or the first TLV is a TLV parallel to the second TLV; or the first TLV is a sub-TLV of a locator TLV; or the first TLV is a sub-TLV of a new top TLV, and the top TLV is a TLV not nested in another TLV.

Optionally, the instruction is further used by the processor to allocate the at least one underlay segment identifier to the at least one underlay path; or the instruction is further used by the processor to control the transceiver to receive a configuration instruction, and obtain, from the configuration instruction, a correspondence between the at least one underlay segment identifier and the one or more of the at least one underlay path.

Optionally, the instruction is further used by the processor to control a memory to store a binding relationship between an underlay segment identifier and an underlay outbound interface. The instruction is further used by the processor to determine, based on the target underlay segment identifier and the binding relationship, an underlay outbound interface bound to the target underlay segment identifier. The instruction is further used by the processor to control the transceiver to send the data packet through the underlay outbound interface.

According to an eighth aspect, a computer-readable storage medium is provided. The storage medium stores at least one instruction.

The instruction is used for loading by a processor to control a transceiver to receive at least one underlay segment identifier from a first network node. The first network node is connected to a second network node through at least one underlay path. The underlay path is a data link layer path, a physical layer path, or a path constructed by using a tunneling technology. Each underlay segment identifier corresponds to one or more of the at least one underlay path.

The instruction is further used by the processor to control the transceiver to receive a data packet.

The instruction is further used by the processor to add a target underlay segment identifier to the data packet. The target underlay segment identifier is any one of the at least one underlay segment identifier.

The instruction is further used by the processor to control the transceiver to send the data packet carrying the target underlay segment identifier to the first network node.

Optionally, one or more of the at least one underlay segment identifier is an underlay link segment identifier.

Optionally, the one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the instruction is further used by the processor to select, from the at least one underlay path based on a service carried in the data packet, an underlay path corresponding to the service, and use an underlay segment identifier corresponding to the selected underlay path as the target underlay segment identifier; or the instruction is further used by the processor to control the transceiver to receive the target underlay segment identifier from a controller of a segment routing network.

Optionally, the instruction is used by the processor to select, from the at least one underlay path based on a path parameter of each underlay path, an underlay path whose path parameter meets a transmission requirement of the service.

Optionally, the instruction is further used by the processor to control the transceiver to receive a path parameter of the one or more of the at least one underlay path from the first network node.

Optionally, the instruction is further used by the processor to control the transceiver to receive an identifier of the second network node from the first network node.

Optionally, the instruction is further used by the processor to control the transceiver to receive a path type of the one or more of the at least one underlay path.

According to a ninth aspect, a computer program is provided. The computer program is used to perform the method in any one of the first aspect or the optional manners of the first aspect.

According to a tenth aspect, a computer program is provided. The computer program is used to perform the method in any one of the second aspect or the optional manners of the second aspect.

According to an eleventh aspect, a data transmission system is provided. The data transmission system includes a first network node and a head node. The first network node is configured to perform the method in any one of the first aspect or the optional manners of the first aspect. The head node is configured to perform the method in any one of the second aspect or the optional manners of the second aspect.

BRIEF DESCRIPTION OF DRAWINGS

FIG. 5 is a schematic diagram of a TLV format according to an embodiment of this application;

FIG. 6 is a schematic diagram of a TLV format according to an embodiment of this application;

FIG. 7 is a schematic diagram of a TLV format according to an embodiment of this application;

FIG. 8 is a schematic diagram of a TLV format according to an embodiment of this application;

FIG. 9 is a schematic diagram of a TLV format according to an embodiment of this application;

FIG. 11 is a schematic diagram of a TLV format according to an embodiment of this application;

FIG. 12 is a schematic diagram of a TLV format according to an embodiment of this application;

FIG. 14 is a schematic diagram of a TLV format according to an embodiment of this application;

FIG. 15 is a schematic diagram of a TLV format according to an embodiment of this application;

DESCRIPTION OF EMBODIMENTS

Figure 1:
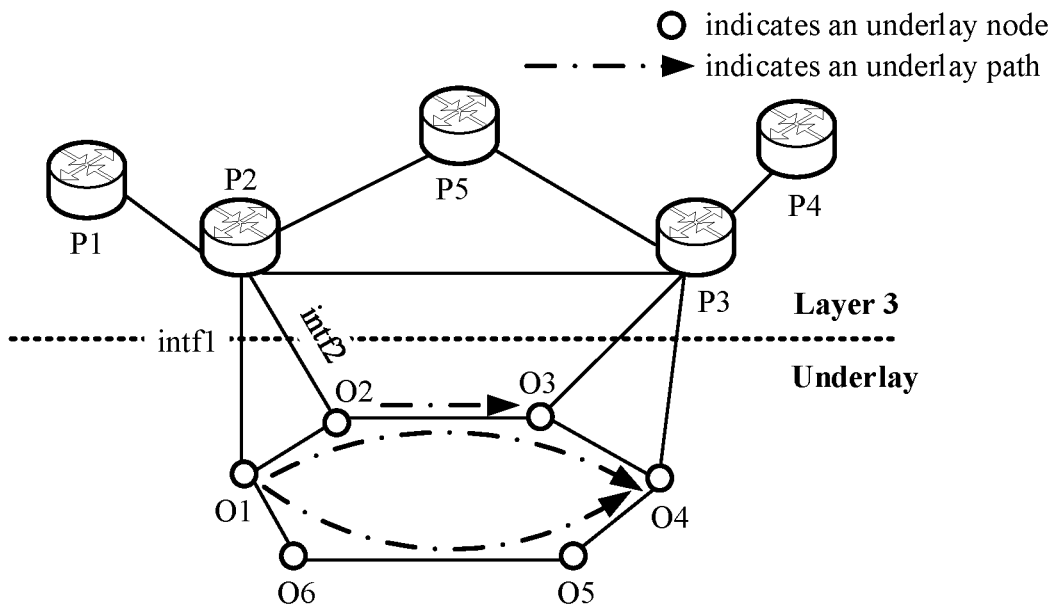
FIG. 1 is an architectural diagram of a data transmission system according to an embodiment of this application.

To make the objectives, technical solutions, and advantages of this application clearer, the following further describes the embodiments of this application in detail with reference to the accompanying drawings.

In this application, the term "plurality" means at least two. For example, a plurality of underlay segment identifiers mean at least two underlay segment identifiers, and a plurality of underlay paths mean at least two underlay paths.

In this application, the terms "first", "second", and the like are used to distinguish between same items or similar items that have a basically same usage and function. It should be understood that "first", "second", and "$n^{th}$" do not have a dependency relationship in logic or timing, and do not limit a quantity or an execution sequence either.

Terms included in this application are described below.

Segment routing (SR) is a protocol designed based on an idea of source routing to forward data packets on a network. SR divides a network path into segments and allocates segment identifiers (SID) to the segments and network nodes. A SID list (also referred to as a label stack in SR-MPLS) may be obtained by sorting the SIDs in order. The SID list may indicate a forwarding path. With the SR technology, a node and a path that a data packet carrying the SID list is to pass may be specified, to meet a traffic adjustment requirement. To make an analogy, the data packet may be compared to luggage, and SR may be compared to attaching a label to the luggage. If the luggage needs to be sent from a region A to a region D through a region B and a region C, a label indicating to "go to the region B first, then to the region C, and finally to the region D" may be attached to the luggage in the origin region A. In this way, the label on the luggage simply needs to be identified in each region, and the luggage may be forwarded from one region to another region based on the label of the luggage. In the SR technology, a source node adds a label to the data packet, and an intermediate node may forward the data packet to a next node based on the label until the data packet arrives at a destination node. For example, <SID 1, SID 2, SID 3> is inserted into a packet header of the data packet, and the data packet is first forwarded to a node corresponding to the SID 1, and then forwarded to a node corresponding to the SID 2, and then forwarded to a node corresponding to the SID 3. SR-MPLS is short for segment routing multiprotocol label switching.

Internet protocol version 6 (IPv6)-based segment routing (SRv6) is to use the SR technology on an IPv6 network. An IPv6 address (e.g., 128 bits) is a representation of a SID. When forwarding a data packet, a network device supporting SRv6 queries a local segment identifier table (local SID table) based on a destination address (DA) in the data packet. When a longest match is found between the destination address of the data packet and any SID in the local segment identifier table, the network device performs, according to a policy related to the SID in the local segment identifier table, an operation corresponding to the policy. For example, the network device may forward the data packet through an outbound interface corresponding to the SID. If no longest match is found between the destination address of the data packet and any SID in the local segment identifier table, the network device queries an IPv6 forwarding table, and performs longest-match forwarding based on the IPv6 forwarding table.

Segment routing header (SRH): An IPv6 packet includes an IPv6 standard header, an extension header (0, . . . , n), and a payload. To implement SRv6 based on an IPv6 forwarding plane, an IPv6 extension header referred to as an SRH extension header is added. The extension header specifies an IPv6 explicit path and stores IPv6 segment list information. A function of the extension header is the same as that of a segment list in SR MPLS. A head node adds an SRH extension header to an IPv6 packet, so that an intermediate node may forward the packet based on path information included in the SRH extension header.

Binding SID (BSID): A BSID is bound to a SID list. When receiving a valid BSID, a node performs a BSID-related operation. In SR-MPLS, the BSID-related operation may be: popping out the BSID and pushing a corresponding SID list. In SRv6, the BSID-related operation may be: based on different BSID functions, inserting a new SRH header (End.B6. Insert), or inserting a new outer IPv6 header (End.B6. Encaps) that includes an SRH.

BGP-LS is a new way of collecting network topology information. The BGP protocol aggregates topology information collected by the IGP, and sends the topology information to an upper-layer controller.

The following describes a system architecture in this application by using an example.

FIG. 1 is an architectural diagram of a data transmission system according to an embodiment of this application. A network including the system may be provided as a segment routing network, for example, an SRv6 network. The system includes a plurality of network nodes, and the network node may be P1, P2, P3, P4, or P5.

A region above a dotted division line in FIG. 1 indicates a topology of a packet switched network, and the packet switched network may also be referred to as an IP layer network or a layer 3 network. A region below the dotted division line in FIG. 1 indicates a topology of an underlay network.

P1, P2, P3, P4, and P5 represent internet protocol (IP) layer nodes. The IP layer node may be a router, a layer 3 switch, or the like. Lines between P1, P2, P3, P4, and P5 represent IP layer paths. For example, a line between P1 and P2 represents an IP layer path between P1 and P2. An IP layer path between any two IP layer nodes may be established based on IP addresses of the two IP layer nodes. P1 is a head node. The head node is a node at an ingress of the segment routing network, and the head node is configured to add a SID to a data packet.

O1, O2, O3, O4, and O5 represent underlay nodes. The underlay node may be a data link layer node or a physical layer node, for example, an optical layer node. The optical layer node may be an optical transport network (OTN) device, an optical cross-connect (OXC) device, or the like. Lines between O1, O2, O3, O4, and O5 represent underlay paths.

The underlay path is a data link layer path, a physical layer path, or a path constructed by using a tunneling technology. The tunneling technology is a way of establishing an end-to-end virtual link between networks by using Internet infrastructure to transmit data. For example, the path constructed by using the tunneling technology may be an IP tunnel or a UDP tunnel. Specifically, the underlay path may be a path for transmitting an optical signal, or may be a path for transmitting an electrical signal. The underlay path may be a physical path or a virtual path. For example, the underlay path may be an optical path, an ATM path, an FR path, a back-to-back Ethernet (Ethernet) path, a GRE tunnel, a FlexE path, an MPLS RSVP-TE tunnel, an IP tunnel, or a UDP tunnel. The optical path may be a DWDM path or an OTN path. Back-to-back means that two nodes are directly connected to each other. One underlay path may pass one or more underlay nodes. For example, referring to FIG. 1, the underlay path may be (O1, O2, O3, O4), and (O1, O2, O3, O4) may pass the underlay node O1, the underlay node O2, the underlay node O3, and the underlay node O4. Alternatively, the underlay path may be (O1, O6, O5, O4), and (O1, O6, O5, O4) may pass the underlay node O1, the underlay node O6, the underlay node O5, and the underlay node O4.

P2 and P3 are located at edges of the packet switched network and the underlay network, and may be treated as gateways between the packet switched network and the underlay network. For example, if the underlay path is an optical path, P2 and P3 may be referred to as packet optical gateways (POG). The POG is configured to generate a transport segment, generate a mapping relationship between a transport segment and an optical path, and advertise the generated transport segment on the network. If the POG receives a data packet and the data packet carries a previously advertised transport segment, the POG finds, based on the mapping relationship, an optical path to which the transport segment is mapped, and sends the data packet through the optical path. The POG may be co-deployed or separately deployed. The co-deployment scenario means that P2 or P3 can independently perform the foregoing steps such as determining the mapped optical path based on the transport segment and transmitting the data packet through the optical path. The separate deployment means that P2 needs to be combined with O1 to perform the foregoing steps such as determining the mapped optical path based on the transport segment and transmitting the data packet through optical path, and P3 needs to be combined with O4 to perform the foregoing steps such as determining the mapped optical path based on the transport segment and transmitting the data packet through the optical path.

In a possible scenario, one IP layer path between P2 and P3 may correspond to a plurality of underlay paths. As shown in FIG. 1, P2 has two outbound interfaces. The two outbound interfaces are denoted as intf1 and intf2. P2 establishes an IP layer path 1 to P3 through intf1, and P2 establishes an IP layer path 2 to P3 through intf2. The IP layer path 1 corresponds to two underlay paths: (O1, O2, O3, O4) and (O1, O6, O5, O4). The IP layer path 2 corresponds to one underlay path: (O2, O3).

In FIG. 1, although the IP layer path 1 corresponds to two underlay paths, because a current IP network cannot sense the two underlay paths, when a data packet is transmitted through the IP layer path 1, only a preconfigured underlay path can be used to transmit the data packet by default. For example, if (O1, O2, O3, O4) is preconfigured, (O1, O2, O3, O4) is used to transmit the data packet by default, and (O1, O6, O5, O4) cannot be used to transmit the data packet. Further, an underlay path suitable for transmitting the data packet cannot be selected from the two underlay paths based on a service carried in the data packet.

However, this embodiment of this application proposes a concept of an underlay segment identifier, and the underlay segment identifier may correspond to one or more underlay paths. On the segment routing network shown in FIG. 1, the underlay segment identifier is advertised on the segment routing network by using a method provided in the following embodiment of FIG. 4, so that the IP network can sense the underlay path by using the underlay segment identifier. After the underlay segment identifier is introduced, traffic originating from P1 may carry the underlay segment identifier to specify an underlay path that the traffic is to pass. For example, it may be specified whether a data packet is to be transmitted through (O1, O2, O3, O4) or (O1, O6, O5, O4). P1 adds an underlay segment identifier corresponding to a specified underlay path to the data packet, and sends the data packet to P2. P2 transmits the data packet through the specified underlay path based on the underlay segment identifier in the data packet. In this way, different services can be transmitted on different underlay paths, thereby implementing traffic adjustment. For example, the underlay path may be an optical path, and an underlay segment identifier corresponding to the optical path is advertised on the segment routing network, so that the optical path also serves as a transport segment of the segment routing network. In this way, a control-plane solution applicable to packet-optical integration (packet-optical integration, POI) is provided, so that the head node can select an optical path based on a service.

In this scenario in which an IP layer path and an underlay path are in a one-to-many relationship, an underlay path may be considered as a subordinate of a layer 3 adjacency SID. Alternatively, an underlay path may be considered as another connection providing capability parallel to a layer 3 adjacency SID. A segment identifier specially designed by the segment routing network for the underlay network, namely, the underlay segment identifier proposed in this embodiment, needs to be used to invoke the underlay path.

Figure 2:
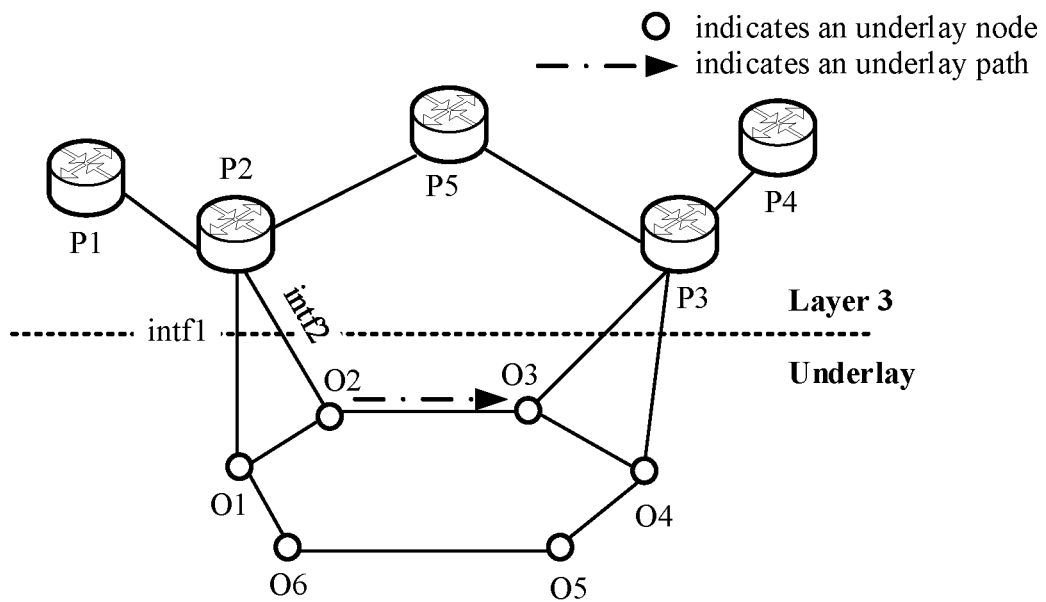
FIG. 2 is an architectural diagram of a data transmission system according to an embodiment of this application.

In another possible scenario, no IP layer path may be established between P2 and P3, but one or more underlay paths are established. For example, P2 and P3 may be connected to each other through 100G Ethernet. In the co-deployment scenario, that is, P2 is both an IP layer node and an optical layer node, P2 and O1 may be connected to each other through an OTN or DWDM. For example, as shown in FIG. 2, P2 may establish an underlay path (O2, O3) to P3 through intf2. In this scenario, the current IP network cannot sense the underlay path (O2, O3), and further, cannot transmit a data packet through the underlay path.

However, in this embodiment, P2 may advertise an underlay segment identifier corresponding to (O2, O3), and P1 may sense the underlay path (O2, O3) by using the underlay segment identifier. In this case, in a process of transmitting a data packet, P1 may add the underlay segment identifier corresponding to (O2, O3) to the data packet, and P2 sends the data packet through (O2, O3) based on the underlay segment identifier in the data packet, to implement the underlay path (O2, O3).

It should be noted that, in FIG. 1, there is a horizontal line at layer 3 between P2 and P3, and the horizontal line indicates that an IP layer path is established between P2 and P3. However, in FIG. 2, there is no line at layer 3 between P2 and P3. This indicates that no IP layer path is established between P2 and P3.

P2 and P3 are used as examples. That an IP layer path is established between P2 and P3 means that P2 and P3 are in an IGP neighbor relationship at an IP layer. To be specific, P2 is an IGP neighbor device of P3, and P3 is also an IGP neighbor device of P2.

Figure 3:
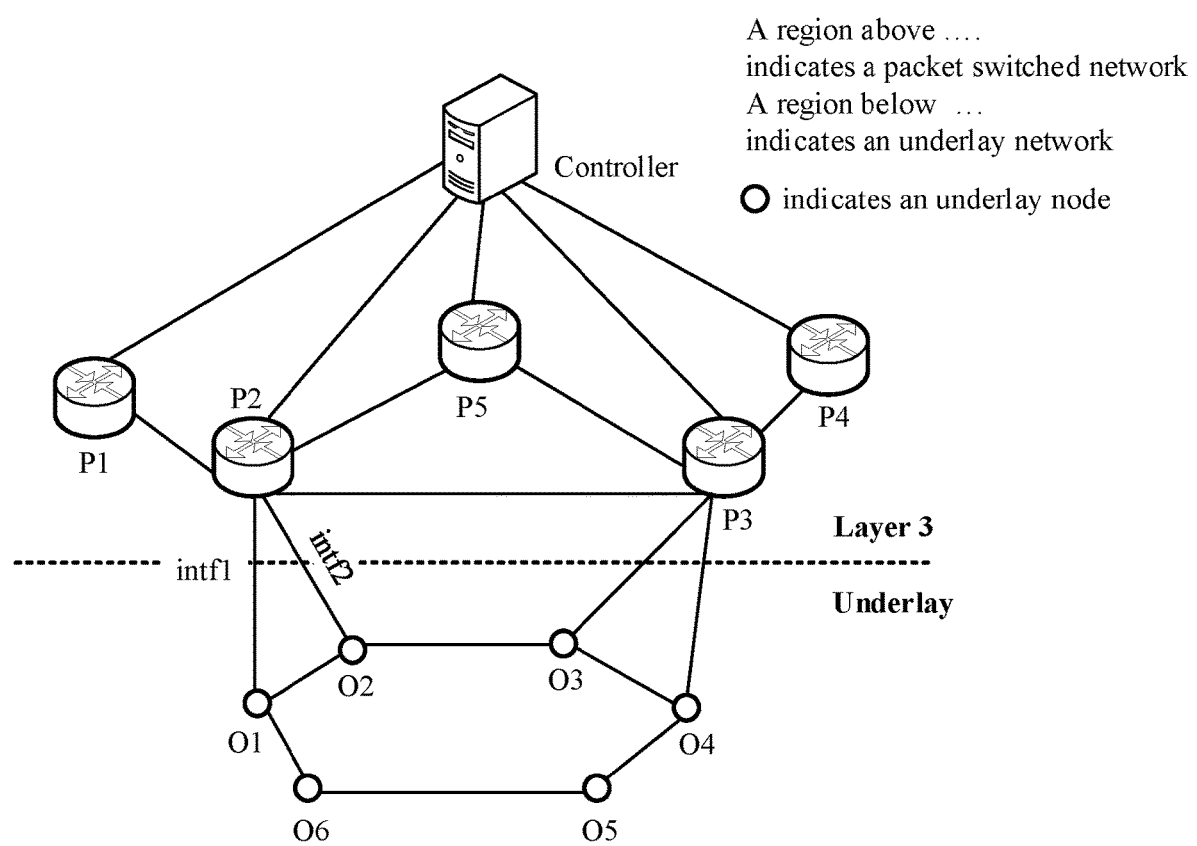
FIG. 3 is an architectural diagram of a data transmission system according to an embodiment of this application.

Optionally, as shown in FIG. 3, the system may further include a controller. The controller is connected to each IP layer node through a wireless network or a wired network. The controller may be configured to select, from a plurality of underlay paths, an underlay path for transmitting a data packet. The controller may be at least one of one server, a plurality of servers, a cloud computing platform, and a virtualization center. When there are a plurality of controllers, there may be at least two controllers configured to provide different services, and/or there may be at least two controllers configured to provide a same service, for example, provide a same service in a load balancing manner. This is not limited in this embodiment of the present invention.

It may be known to a person skilled in the art that the data transmission system may include more or fewer network nodes. For example, there may be dozens of, hundreds of, or more network nodes. A quantity of network nodes and a device type are not limited in this embodiment of this application.

The following describes a method process in this application by using an example.

Figure 4:
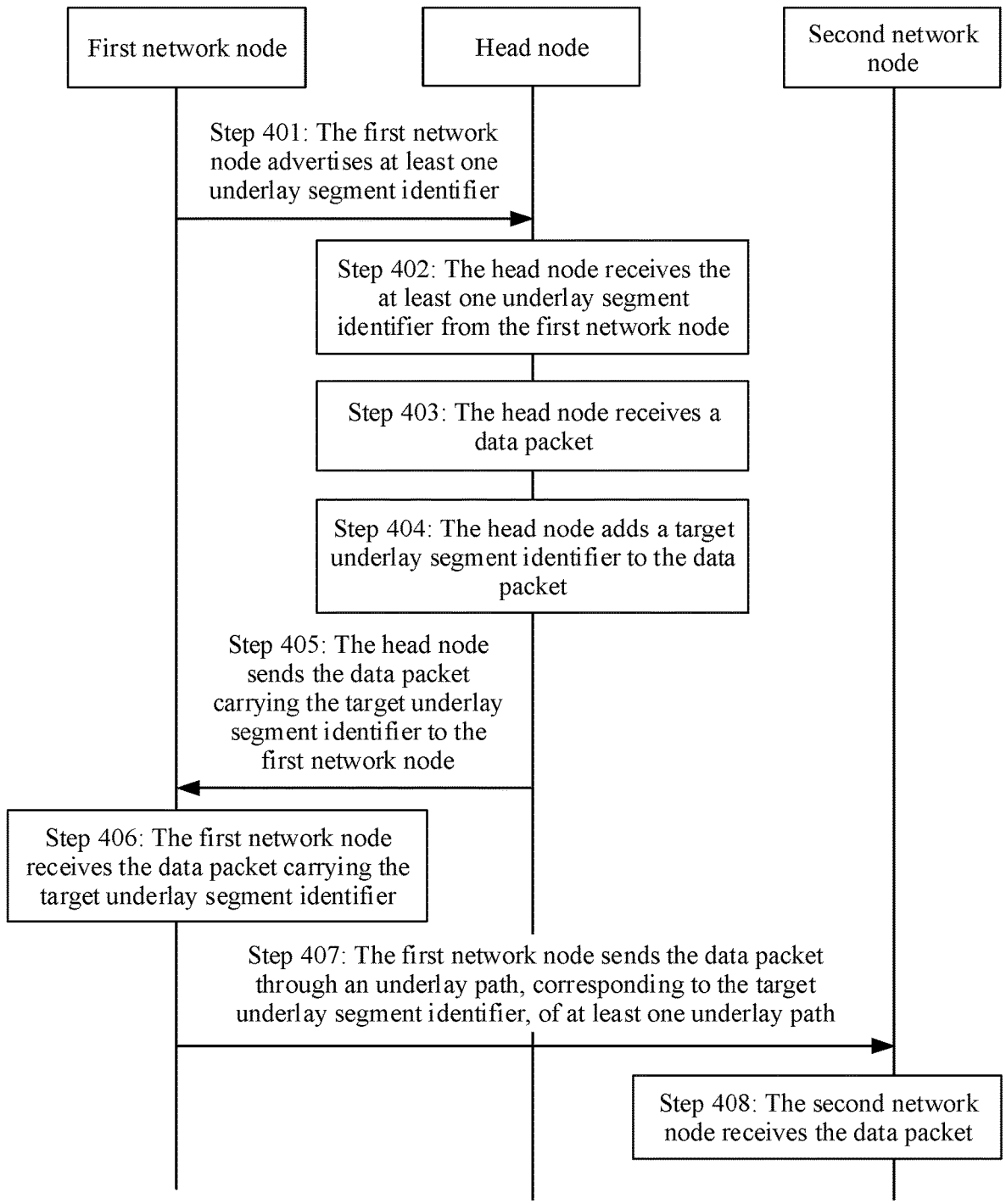
FIG. 4 is a flowchart of a data transmission method according to an embodiment of this application.

FIG. 4 is a flowchart of a data transmission method according to an embodiment of this application. As shown in FIG. 4, interaction entities of the method include a first network node, a second network node, and a head node. The first network node is connected to the second network node through at least one underlay path. The first network node may be P2 in the system architecture shown in FIG. 1, FIG. 2, or FIG. 3. The second network node may be P3 in the system architecture shown in FIG. 1, FIG. 2, or FIG. 3. The head node may be P1 in the system architecture shown in FIG. 1, FIG. 2, or FIG. 3. The method may include the following steps.

Step 401: The first network node advertises at least one underlay segment identifier.

Each underlay segment identifier corresponds to one or more of the at least one underlay path between the first network node and the second network node. The underlay segment identifier may be referred to as an End.XU SID, where End stands for endpoint, which indicates an endpoint; X stands for crossing, which indicates layer 3 cross-connect; U stands for underlay, which indicates an underlay layer; and SID indicates a segment identifier. The underlay segment identifier may be represented in a form of a number. For example, the underlay segment identifier may be in a format of an IPv6 address.

In some possible embodiments, an underlay segment identifier and an underlay path may be in a one-to-one correspondence. To be specific, one underlay segment identifier uniquely corresponds to one underlay path. In some other possible embodiments, an underlay segment identifier and an underlay path may be alternatively in a one-to-many relationship. To be specific, one underlay segment identifier may correspond to a plurality of underlay paths, and different underlay paths corresponding to one underlay segment identifier may share load. For example, if four underlay paths denoted as an underlay path 1, an underlay path 2, an underlay path 3, and an underlay path 4 are connected between the first network node and the second network node, the first network node may advertise two underlay segment identifiers denoted as an underlay segment identifier 1 and an underlay segment identifier 2. The underlay segment identifier 1 corresponds to the underlay path 1, the underlay path 2, and the underlay path 3. The underlay segment identifier 4 corresponds to the underlay path 4. In this example, the underlay segment identifier 1 corresponds to three underlay paths, so that the three underlay paths can share load.

The first network node may have one or more outbound interfaces. Each underlay path may correspond to one outbound interface of the first network node. The outbound interface may be a physical outbound interface or a logical outbound interface. The corresponding herein means that, if an underlay path i corresponds to an outbound interface j, after a data packet is sent through the outbound interface i, the data packet enters the underlay path j, and the data packet may arrive at the second network node along the underlay path j, where i indicates an identifier of the outbound interface, and j indicates an identifier of the underlay path.

In some possible embodiments, for example, an underlay segment identifier is denoted as S, and a network node is denoted as N. An operation performed based on the underlay segment identifier may be as follows:

When N receives a packet destined to S and S is a local End.XU SID, N does:
//When N receives a data packet whose destination address is S and S is an underlay
//segment identifier advertised by N, N performs the following steps:
IF NH=SRH and SL>0
  //If a next header (next header, NH) is a segment routing header (segment
  //routing header, SRH) and a quantity of remaining segments (segment left,
  //SL) is greater than 0
  Decrement SL
    //Decrement the SL by 1
  update the IPv6 DA with SRH[SL]/
    //Update an IPv6 destination address by using the SRH [SL].
  forward to underlay interface bound to the SID S
    //Forward the data packet through an underlay outbound interface
    //bound to the SID.
ELSE//Otherwise
  drop the packet//Drop the data packet Optionally, one or more of the at least one underlay segment identifier may be an underlay link segment identifier. The underlay link segment identifier is used to identify an underlay path, for example, may identify a complete end-to-end path. The end-to-end herein means from one POG to another POG. The underlay link segment identifier is similar to an End.X SID on an SRv6 network and an adjacency SID in SR-MPLS. A difference lies in that the End.X SID is used to identify an IP layer path, the adjacency SID is used to identify an adjacency, and the End.X SID and the adjacency SID are layer 3 concepts that are irrelevant to an underlay network and cannot identify an underlay path.

In some possible embodiments, a layer 3 adjacency between the first network node and the second network node may be identified by using an End.X SID. A relationship between an underlay segment identifier and an End.X SID includes but is not limited to the following two cases.

Case (1): At least two underlay segment identifiers correspond to one End.X SID. In other words, an End.X SID and an underlay segment identifier may be in a one-to-many relationship. In the case (1), the first network node and the second network node establish an adjacency at an IP layer, and are connected through a plurality of underlay paths.

As shown in FIG. 1, P2 has two outbound interfaces. The two outbound interfaces are denoted as inflt1 and intf2. Two IGP-based adjacencies are established between P2 and P3. One of the adjacencies is established through intf1, and the other adjacency is established through intf2. The adjacency established through inflt1 corresponds to two underlay paths: (O1, O2, O3, O4) and (O1, O6, O5, O4). The adjacency established through intf2 corresponds to one underlay path: (O2, O3). In this example, P2 has five adjacency-type SIDs. The five adjacency-type SIDs include two END.X SIDs and three underlay segment identifiers. One END.X SID of P2 corresponds to intf1. The END.X SID corresponds to two underlay segment identifiers. One underlay segment identifier corresponds to the underlay path (O1, O2, O3, O4), and the other underlay segment identifier corresponds to the underlay path (O1, O6, O5, O4). The other END.X SID of P2 corresponds to intf2. The END.X SID corresponds to one underlay segment identifier. The underlay segment identifier corresponds to the underlay path (O2, O3).

Case (2): The one or more of the at least one underlay segment identifier has no corresponding End.X SID. In other words, an End.X SID and an underlay segment identifier may be in a zero-to-one relationship. To be specific, the first network node and the second network node have not established an adjacency at an IP layer, and are connected through one underlay path. Alternatively, an End.X SID and an underlay segment identifier may be in a zero-to-many relationship. To be specific, the first network node and the second network node have not established an adjacency at an IP layer, and are connected at an underlay layer through a plurality of underlay paths. It should be noted that, in a case, the having not established an adjacency herein may mean that some outbound interfaces of the first network node have not established an adjacency with the second network node, and other outbound interfaces of the first network node have established an adjacency with the second network node; in another case, the having not established an adjacency herein may mean that none of outbound interfaces of the first network node has established an adjacency with the second network node.

As shown in FIG. 1, P2 establishes an IGP-based adjacency with P3 through intf1, and the adjacency corresponds to two underlay paths. The two underlay paths are (O1, O2, O3, O4) and (O1, O6, O5, O4). In addition, P2 establishes an underlay path to P3 through intf2, and the underlay path is (O2, O3). In this example, P2 has four adjacency-type SIDs. The four adjacency-type SIDs include one END.X SID and three underlay segment identifiers. The END.X SID corresponds to intf1. The END.X SID corresponds to two underlay segment identifiers. One underlay segment identifier corresponds to the underlay path (O1, O2, O3, O4), and the other underlay segment identifier corresponds to the underlay path (O1, O6, O5, O4). In addition to the three adjacency-type SIDs, P2 further has one underlay segment identifier. The underlay segment identifier corresponds to the underlay path (O2, O3), but has no corresponding End.X Regarding how the first network node obtains the underlay segment identifier, in some possible embodiments, the first network node may automatically allocate the at least one underlay segment identifier, or the at least one underlay segment identifier may be manually configured. Specifically, a manner of obtaining the underlay segment identifier may include any one or more of the following manners 1 and 2.

Manner 1: The first network node allocates the at least one underlay segment identifier to the at least one underlay path.

In a possible implementation, the first network node may allocate one underlay segment identifier to each underlay path, and different underlay segment identifiers are allocated to different underlay paths, so that each allocated underlay segment identifier corresponds to one underlay path. In another possible implementation, the first network node may alternatively allocate one underlay segment identifier to a plurality of underlay paths, so that the allocated underlay segment identifier corresponds to the plurality of underlay paths. The first network node may store segment identifier space, and may select an unoccupied underlay segment identifier from the segment identifier space, and allocate the underlay segment identifier to an underlay path.

Manner 2: The first network node receives a configuration instruction, and obtains, from the configuration instruction, a correspondence between the at least one underlay segment identifier and the one or more of the at least one underlay path. The configuration instruction may be triggered by a configuration operation performed by a user on the first network node. The configuration instruction may include the correspondence between the at least one underlay segment identifier and the one or more of the at least one underlay path. Alternatively, the configuration instruction may be triggered by a network management system or a controller (controller).

For example, on the network shown in FIG. 1, a correspondence, obtained by P2, between an underlay segment identifier and an underlay path may be shown in the following Table 1. An End.XU SID 1 corresponds to (O1, O2, O3, O4), an End.XU SID 2 corresponds to (O1, O6, O5, O4), an End.XU SID 3 corresponds to (O2, O3), and an End.XU SID 4 corresponds to (O1, O2, O3, O4) and (O2, O3).

TABLE 1

| Underlay segment identifier | Underlay path |
| --- | --- |
| End.XU SID 1 | (O1, O2, O3, O4) |
| End.XU SID 2 | (O1, O6, O5, O4) |
| End.XU SID 3 | (O2, O3) |
| End.XU SID 4 | (O1, O2, O3, O4) |
|  | (O2, O3) |

In some possible embodiments, after obtaining the at least one underlay segment identifier, the first network node may store a binding relationship between an underlay segment identifier and an underlay outbound interface. In a possible implementation, if an underlay segment identifier corresponds to one underlay path, an underlay segment identifier and an underlay outbound interface may be in a one-to-one relationship. To be specific, each underlay segment identifier is bound to one underlay outbound interface. After a data packet is sent through the underlay outbound interface bound to the underlay segment identifier, the data packet enters the underlay path corresponding to the underlay segment identifier. In another possible implementation, if an underlay segment identifier corresponds to a plurality of underlay paths, an underlay segment identifier and an underlay outbound interface may be in a one-to-many relationship. To be specific, each underlay segment identifier is bound to a plurality of underlay outbound interfaces. After a data packet is sent through any one of the plurality of underlay outbound interfaces bound to the underlay segment identifier, the data packet enters one of the plurality of underlay paths corresponding to the underlay segment identifier, so that the plurality of underlay paths can share load.

Regarding an implementation of load sharing, in a possible implementation, if an underlay segment identifier corresponds to a plurality of underlay paths, when receiving a plurality of data packets carrying the underlay segment identifier, the first network node may use a load sharing algorithm to obtain a transmission ratio between different underlay paths of the plurality of underlay paths corresponding to the underlay segment identifier, and transmit a corresponding proportion of the data packets on each underlay path based on the transmission ratio. The transmission ratio is a ratio between quantities of data packets transmitted on different underlay paths.

For example, if an underlay segment identifier corresponds to the underlay path 1 and the underlay path 2, when receiving a plurality of data packets carrying the underlay segment identifier, the first network node may learn, by using the load sharing algorithm, that a transmission ratio between the underlay path 1 and the underlay path 2 is 3:7. In this case, the first network node may transmit 30% of the plurality of data packets on the underlay path 1, and transmit 70% of the plurality of data packets on the underlay path 2.

It should be noted that, for any data packet, when an underlay segment identifier carried in the data packet corresponds to a plurality of underlay outbound interfaces, the data packet is sent through one of the plurality of underlay outbound interfaces. A specific underlay outbound interface, through which the data packet is sent, of the plurality of underlay outbound interfaces may be determined based on the load sharing algorithm. This is not limited in this embodiment. In addition, the load sharing algorithm used by the first network node may be selected based on an actual requirement. A type of the load sharing algorithm is not limited in this embodiment either. In addition, a plurality of data packets that carry a same underlay segment identifier and that are received by the first network node may belong to a same data flow or different data flows, and the data flow may be a plurality of data packets that have a same 5-tuple. Whether the plurality of received data packets that carry the same underlay segment identifier belong to a same data flow is not limited in this embodiment.

It should be noted that the underlay outbound interface in this embodiment may be a physical interface or a virtual interface. The physical interface may be inflt1 or intf2 in FIG. 1. The virtual interface may be obtained by performing virtual division on a physical interface. One physical interface may correspond to one or more virtual interfaces. For example, one physical interface may be divided into one or more VLAN interfaces by using a virtual local area network (VLAN) technology, each VLAN interface may serve as an underlay outbound interface, and each VLAN interface is in a one-to-one correspondence with each underlay path. For another example, one physical interface may be divided into one or more slots by using an OTN technology, each slot may serve as an underlay outbound interface, and each slot is in a one-to-one correspondence with each underlay path. For another example, the physical interface may be an optical fiber, one optical fiber may correspond to one or more wavelengths, each wavelength may serve as an underlay outbound interface, and each wavelength is in a one-to-one correspondence with each underlay path.

If one underlay segment identifier corresponds to a plurality of underlay paths, the underlay segment identifier is bound to a plurality of underlay outbound interfaces corresponding to the plurality of underlay paths. A binding relationship between the underlay segment identifier and the plurality of underlay outbound interfaces may be but is not limited to the following two cases.

Case 1: The underlay segment identifier is bound to a plurality of virtual interfaces corresponding to one physical interface.

For example, on the network shown in FIG. 1, a correspondence, stored on P2, between an underlay segment identifier, an underlay outbound interface, and an underlay path may be shown in the following Table 2. It can be learned from Table 2 that an End.XU SID 1 is bound to two underlay outbound interfaces: a virtual interface 1 and a virtual interface 2. The two underlay outbound interfaces both correspond to a physical interface intf1. The virtual interface 1 corresponds to (O1, O2, O3, O4), and the virtual interface 2 corresponds to (O1, O6, O5, O4).

Based on Table 2, if P2 receives a plurality of data packets carrying an End.XU SID 3, P2 may find, through querying based on the End.XU SID 3, that an underlay outbound interface is the virtual interface 1 corresponding to intf1. In this case, P2 sends the plurality of data packets through the virtual interface 1 corresponding to intf1, and the plurality of data packets are transmitted from P2 to P3 through one underlay path: (O1, O2, O3, O4) corresponding to the virtual interface 1.

TABLE 2

| Underlay segment identifier | Physical interface | Underlay outbound interface | Underlay path |
| --- | --- | --- | --- |
| End.XU SID 1 | intf1 | Virtual interface 1 | (O1, O2, O3, O4) |
|  |  | Virtual interface 2 | (O1, O6, O5, O4) |
| End.XU SID 2 | intf2 | Virtual interface 3 | (O2, O3) |
| End.XU SID 3 | intf1 | Virtual interface 1 | (O1, O2, O3, O4) |

Based on Table 2, if P2 receives a plurality of data packets carrying the End.XU SID 1, P2 may find, through querying based on the End.XU SID 1, that underlay outbound interfaces are the virtual interface 1 and the virtual interface 2 that correspond to intf1. In this case, P2 sends the plurality of data packets through the virtual interface 1 and the virtual interface 2 that correspond to intf1, and the plurality of data packets are transmitted from P2 to P3 through two underlay paths: (O1, O2, O3, O4) corresponding to the virtual interface 1 and (O1, O6, O5, O4) corresponding to the virtual interface 2. Some of the plurality of data packets are transmitted from P2 to P3 from the virtual interface 1 through (O1, O2, O3, O4). The other part of the plurality of data packets are transmitted from P2 to P3 from the virtual interface 2 through (O1, O6, O5, O4). For example, if P1 learns, by using the load sharing algorithm, that a transmission ratio between (O1, O2, O3, O4) and (O1, O6, O5, O4) is 3:7, P1 may send 30% of the data packets from the virtual interface 1, and the 30% of the data packets are transmitted from P2 to P3 through (O1, O2, O3, O4). In addition, P1 may send remaining 70% of the data packets from the virtual interface 2, and the 70% of the data packets are transmitted from P2 to P3 through (O1, O6, O5, O4).

With reference to the foregoing example, it can be learned that, a difference between the End.XU SID 1 and the End.XU SID 3 lies in that the End.XU SID 3 is bound to one underlay outbound interface, and the End.XU SID 3 corresponds to one underlay path, but the End.XU SID 1 is bound to two underlay outbound interfaces, and the End.XU SID 1 corresponds to two underlay paths to implement load sharing.

Case 2: The underlay segment identifier is bound to a plurality of virtual interfaces corresponding to different physical interfaces.

For example, on the network shown in FIG. 1, a correspondence, stored on P2, between an underlay segment identifier, an underlay outbound interface, and an underlay path may be alternatively shown in the following Table 3. It can be learned from Table 3 that an End.XU SID 4 is bound to two underlay outbound interfaces: a virtual interface 1 and a virtual interface 3. The virtual interface 1 corresponds to a physical interface intf1, and the virtual interface 1 corresponds to (O1, O2, O3, O4). The virtual interface 3 corresponds to a physical interface intf2, and the virtual interface 3 corresponds to (O2, O3).

TABLE 3

| Underlay segment identifier | Physical interface | Underlay outbound interface | Underlay path |
| --- | --- | --- | --- |
| End.XU SID 1 | intf1 | Virtual interface 1 | (O1, O2, O3, O4) |
| End.XU SID 2 | intf1 | Virtual interface 2 | (O1, O6, O5, O4) |
| End.XU SID 3 | intf2 | Virtual interface 3 | (O2, O3) |
| End.XU SID 4 | intf1 | Virtual interface 1 | (O1, O2, O3, O4) |
|  | intf2 | Virtual interface 3 | (O2, O3) |

Based on Table 3, if P2 receives a plurality of data packets carrying the End.XU SID 4, P2 may find, through querying based on the End.XU SID 4, that underlay outbound interfaces are the virtual interface 1 and the virtual interface 3. In this case, P2 sends the plurality of data packets through the virtual interface 1 corresponding to inflt1 and the virtual interface 3 corresponding to intf2, and the plurality of data packets are transmitted from P2 to P3 through two underlay paths: (O1, O2, O3, O4) corresponding to the virtual interface 1 and (O2, O3) corresponding to the virtual interface 3. Some of the plurality of data packets are transmitted from P2 to P3 from the virtual interface 1 through (O1, O2, O3, O4). The other part of the plurality of data packets are transmitted from P2 to P3 from the virtual interface 3 through (O2, O3).

In some possible embodiments, after obtaining the at least one underlay segment identifier, the first network node may write the at least one underlay segment identifier into a local segment identifier table (local SID table), so that a data packet may be subsequently forwarded by querying the local SID table. The local segment identifier table is used to record each segment identifier of the first network node.

A manner of advertising the underlay segment identifier may be but is not limited to any one of the following manner 1 to manner 3.

Manner 1: The first network node may advertise the at least one underlay segment identifier by using an IGP.

Specifically, the first network node may flood the at least one underlay segment identifier to a packet switched network by using the IGP. Flooding (flooding) is a manner in which, after a node advertises specific information to an adjacent node, the adjacent node transmits the same information to a neighboring node other than the node that sends the information, and in this way, the information is transmitted to all nodes on an entire network level by level. Through flooding, all nodes on the entire network can share the information. In the manner 1, the at least one underlay segment identifier is flooded, so that each IP layer node on the packet switched network may receive the underlay segment identifier. For example, referring to FIG. 1, after P2 floods the underlay segment identifier, P1, P3, P4, and P5 may all receive the underlay segment identifier.

Manner 2: The first network node may advertise the at least one underlay segment identifier by using a BGP-LS.

Specifically, the first network node may send the at least one underlay segment identifier to the controller by using the BGP-LS. The controller may receive, by using the BGP-LS, the at least one underlay segment identifier sent by the first network node, and send the at least one underlay segment identifier to the head node. For example, referring to FIG. 3, P2 may send the underlay segment identifier to the controller by using the BGP-LS, and the controller may send the underlay segment identifier to P1 by using the BGP-LS.

Manner 3: The first network node may advertise the at least one underlay segment identifier by using a PCEP.

Specifically, the first network node may send the at least one underlay segment identifier to the controller by using the PCEP. The controller may receive, by using the PCEP, the at least one underlay segment identifier sent by the first network node, and send the at least one underlay segment identifier to the head node. For example, referring to FIG. 3, P2 may send the underlay segment identifier to the controller by using the PCEP, and the controller may send the underlay segment identifier to P1 by using the PCEP.

Optionally, the first network node may further advertise a path parameter of the one or more of the at least one underlay path, so that the head node or the controller selects, based on the path parameter, an underlay path for transmitting a data packet. The path parameter may be any one or more of a latency, a bandwidth, a quality, a direction, and a protection of the underlay path. In a possible implementation, the first network node may advertise the path parameter of the underlay path together with an underlay segment identifier corresponding to the underlay path. For example, the first network node may add, to one packet, the path parameter of the underlay path and the underlay segment identifier corresponding to the underlay path, and advertise the packet.

Optionally, the first network node may further advertise an identifier of the second network node, so that the head node or the controller determines, based on the identifier of the second network node, which network node is a peer node of the underlay path. For example, referring to FIG. 1, P2 may advertise not only the underlay segment identifier End.XU SID 1 corresponding to the underlay path (O1, O2, O3, O4), but also an ID of P3, so that P1 senses that a peer node of the underlay path (O1, O2, O3, O4) is P2. In a possible implementation, the first network node may advertise the identifier of the second network node together with the underlay segment identifier corresponding to the underlay path. For example, the first network node may add, to one packet, the identifier of the second network node and the underlay segment identifier corresponding to the underlay path, and advertise the packet. In another possible implementation, the first network node may separately advertise the identifier of the second network node and the underlay segment identifier corresponding to the underlay path. For example, the first network node may first advertise the underlay segment identifier corresponding to the underlay path, and then advertise the identifier of the second network node. A time sequence for advertising the identifier of the second network node and the underlay segment identifier corresponding to the underlay path is not limited in this embodiment.

Optionally, the first network node may further advertise a path type of the one or more of the at least one underlay path. The path type is used to indicate a type of the underlay path. For example, the path type may be a DWDM path, an OTN path, an ATM path, an FR path, a back-to-back Ethernet path, a GRE tunnel, a FlexE path, an MPLS RSVP-TE tunnel, an IP tunnel, or a UDP tunnel. The path type is further advertised on a basis of advertising the underlay path. The head node or the controller can determine a specific type of the advertised underlay path, so that different types of underlay paths can be distinguished, and a specific type of underlay path can be scheduled based on a service requirement for data transmission.

Regarding a manner of advertising the underlay segment identifier, in some possible embodiments, the at least one underlay segment identifier may be carried in a packet, and the first network node may advertise the at least one underlay segment identifier by advertising the packet. The packet includes at least one first type-length-value (TLV), and each first TLV includes one underlay segment identifier. Regarding an object to which the packet is sent, in a possible implementation, the first network node may flood the packet to the packet switched network, for example, flood the packet by using the IGP. In this case, each IP layer node on the packet switched network may receive the flooded packet. In another possible implementation, the first network node may send the packet to the controller, and the controller may receive the packet.

A TLV is an encoding format that is mainly defined by three types of information: a type, a length, and a value. The first TLV is a TLV that carries an underlay segment identifier. In a possible implementation, the first TLV may be a TLV nested in another TLV. In other words, the first TLV is a sub-TLV (sub-TLV) or a sub-sub-TLV (sub-sub-TLV) of the another TLV. In another possible implementation, the first TLV may be alternatively a sub-TLV of a new top TLV (top TLV), and the top TLV is a TLV not nested in another TLV. A type of the first TLV may be a type newly applied for advertising an underlay segment identifier. For example, the type of the first TLV may be 90. A value of the first TLV may include the underlay segment identifier. For example, the first TLV may include a SID field. The field may occupy 128 bits, and the underlay segment identifier may be written into the field. In addition, the first TLV may further include a flag, an algorithm, a weight, and the like. The flag may be empty, and the weight may be 0 by default. The first TLV may further include an SRv6 endpoint function field. A value of the field is a 32-bit number. The field is used to indicate a function of a SID. A corresponding End.XU function may be pre-registered for the underlay segment identifier. A value of the End.XU function is obtained, and the value is written into the SRv6 endpoint function field, to specify, by using the value of the SRv6 endpoint function field, that a SID carried in the SID field is an underlay segment identifier, but not an End.X SID, a node SID, or another type of SID.

The first TLV may include a path parameter of an underlay path. For example, the first TLV may include a sub-TLV, and the sub-TLV of the first TLV includes the path parameter of the underlay path. Specifically, the sub-TLV of the first TLV may include a type, a length, and a value. The type of the sub-TLV of the first TLV may be an unused new type. The value of the sub-TLV of the first TLV may be the path parameter of the underlay path. For example, the type of the sub-TLV of the first TLV may be 1, where 1 indicates an unused new type; and the value of the sub-TLV of the first TLV may be a 32-bit value that indicates a bandwidth. For another example, the type of the sub-TLV of the first TLV may be 2, where 2 indicates an unused new type; and the value of the sub-TLV of the first TLV may be a 32-bit value that indicates a latency. Certainly, the two path parameters, namely, the bandwidth and the latency, are merely examples, and the path parameter may be alternatively a parameter other than the bandwidth or the latency. This is not limited in this embodiment.

Optionally, the first TLV may further include each segment identifier, related to a neighboring node, of the first network node. Specifically, the first network node may have one or more segment identifiers. Some of the segment identifiers are related to a neighboring node of the first network node, for example, are used to identify an adjacency between the first network node and the neighboring node. The other part of the segment identifiers are irrelevant to a neighboring node of the first network node. In a related technology, for example, in the commonly used IGP protocol IS-IS, a segment identifier related to a neighboring node is advertised in a 22 TLV or a 222 TLV. However, in this embodiment, a segment identifier related to a neighboring node may also be carried in the first TLV. Therefore, the segment identifier related to the neighboring node is advertised by using the first TLV, thereby reducing complexity of the 22 TLV or the 222 TLV. The 22 TLV or the 222 TLV is a TLV used to advertise adjacency information. Specifically, the 22 TLV is used to carry adjacency information of IS-IS, and the 222 TLV is used to carry adjacency information of IS-IS in a multi-topology scenario.

Optionally, the first TLV may further include a path type of an underlay path. Specifically, the first TLV may include a path type field. The path type field may be denoted as an underlay type field. A value of the path type field is used to indicate a path type of an underlay path. For example, if the value of the path type field is 1, it indicates that the path type of the underlay path is an OTN path; if the value of the path type field is 2, it indicates that the path type of the underlay path is a DWDM path; if the value of the path type field is 3, it indicates that the path type of the underlay path is a back-to-back Ethernet path; if the value of the path type field is 4, it indicates that the path type of the underlay path is a GRE tunnel; if the value of the path type field is 5, it indicates that the path type of the underlay path is an MPLS RSVP-TE tunnel; if the value of the path type field is 6, it indicates that the path type of the underlay path is an IP tunnel; if the value of the path type field is 7, it indicates that the path type of the underlay path is an IP tunnel or a UDP tunnel; if the value of the path type field is 8, it indicates that the path type of the underlay path is an ATM path; if the value of the path type field is 9, it indicates that the path type of the underlay path is an FR path; or if the value of the path type field is 10, it indicates that the path type of the underlay path is a FlexE path.

In some possible embodiments, a manner of advertising an underlay segment identifier may specifically include the following manner (1) to manner (4).

Manner (1): The first TLV is a sub-TLV of a second TLV

The second TLV is a TLV including an End.X SID. The first TLV and the second TLV may be in a subordinate relationship (or referred to as a parent-child relationship). One second TLV may alternatively include one or more first TLVs. For example, the second TLV may be a sub-TLV of the 22 TLV of intermediate system to intermediate system (IS-IS), and the first TLV is a sub-sub-TLV of the second TLV. Alternatively, the second TLV may be a sub-TLV of the 222 TLV of IS-IS, and the first TLV is a sub-sub-TLV of the second TLV.

Both FIG. 5 and FIG. 6 are schematic diagrams of formats of the second TLV. A type field in FIG. 5 or FIG. 6 indicates a type of the second TLV. A value of the type field may indicate that the second TLV is a TLV used to advertise an End.X SID. A value of a length field in FIG. 5 or FIG. 6 is a length of the second TLV An SRv6 endpoint function field in FIG. 5 or FIG. 6 is used to indicate a function of a SID, and may specifically indicate an End.X function. A SID field in FIG. 5 and FIG. 6 is used to carry an End.X SID. The SID field in FIG. 5 and FIG. 6 occupies 128 bits. The SID field is divided into four segments, and each segment of the SID field occupies 32 bits. The $1^{st}$ segment of the SID field carries the $1^{st}$ bit to the $32^{nd}$ bit of the End.X SID. The $2^{nd}$, $3^{rd}$, and $4^{th}$ segments of the SID field are continuations of the $1^{st}$ segment of the SID field. The $2^{nd}$ segment of the SID field carries the $33^{rd}$ bit to the $64^{th}$ bit of the End.X SID. The $3^{rd}$ segment of the SID field carries the $65^{th}$ bit to the $96^{th}$ bit of the End.X SID. The $4^{th}$ segment of the SID field carries the $97^{th}$ bit to the $128^{th}$ bit of the End.X SID. In addition, FIG. 5 or FIG. 6 further includes a flag field, an algorithm field, a weight field, and the like. The flag field may be empty, and a value of the weight field may be 0 by default. A difference between FIG. 5 and FIG. 6 lies in that, the second TLV shown in FIG. 5 may be used for a point-to-point (P2P) link, and the second TLV shown in FIG. 6 may be used for a local area network (LAN) link.

A "sub-sub-TLV (variable-length)" field shown in FIG. 5 and FIG. 6 occupies eight bytes. The sub-sub-TLV (variable-length) field can specify that one or more sub-sub-TLVs exist after the field. A value of the sub-sub-TLV (variable-length) field is a length of the one or more sub-sub-TLVs. Specifically, the value of the sub-sub-TLV (variable-length) field is determined based on a quantity of the one or more sub-sub-TLVs and a length of each sub-sub-TLV "One or more sub-sub-TLVs (variable)" shown in FIG. 5 and FIG. 6 indicates the one or more sub-sub-TLVs, and a format of the sub-sub-TLV may be shown in FIG. 7.

FIG. 7 is a schematic diagram of a format of the first TLV according to the manner (1). The one or more sub-sub-TLVs (variable) in FIG. 5 or FIG. 6 are one or more first TLVs in FIG. 7, and each first TLV in FIG. 7 is a sub-sub-TLV The first TLV shown in FIG. 5 or FIG. 6 is an End.X TLV, and End.X is a sub-TLV of the 22 TLV whose type is 22 or the 222 TLV whose type is 222. Therefore, a nested TLV in FIG. 5 or FIG. 6 is referred to as a sub-sub-TLV A SID field in FIG. 7 is used to carry an underlay segment identifier. The SID field in FIG. 7 occupies 128 bits.

The SID field is divided into four segments, and each segment of the SID field occupies 32 bits. The $1^{st}$ segment of the SID field carries the $1^{st}$ bit to the $32^{nd}$ bit of the underlay segment identifier. The $2^{nd}$, $3^{rd}$, and $4^{th}$ segments of the SID field are continuations of the $1^{st}$ segment of the SID field. The $2^{nd}$ segment of the SID field carries the $33^{rd}$ bit to the $64^{th}$ bit of the underlay segment identifier. The $3^{rd}$ segment of the SID field carries the $65^{th}$ bit to the $96^{th}$ bit of the underlay segment identifier. The $4^{th}$ segment of the SID field carries the $97^{th}$ bit to the $128^{th}$ bit of the underlay segment identifier.

A value of a type field in FIG. 7 may be a newly applied sub-sub-TLV type, for example, 90. A value of a flag field in FIG. 7 may be empty. A value of a weight field is a weight that is 0 by default. A value of an SRv6 endpoint function field is a SID of the node, and a format is the same as that of an IPv6 address. A value of a sub-sub-sub-TLV field may include a path parameter such as a bandwidth or a latency. A type field of a sub-sub-sub-TLV may be 1 that indicates an unused new type. A length field of the sub-sub-sub-TLV may be a length of the sub-sub-sub-TLV field. A value field of the sub-sub-sub-TLV occupies 32 bits that indicate a bandwidth of an underlay path. The type field of the sub-sub-sub-TLV may be alternatively 2 that indicates an unused new type.

The value field of the sub-sub-sub-TLV may alternatively occupy other 32 bits that indicate a latency of an underlay path. An underlay type field in FIG. 7 describes a type of an underlay path.

For example, the underlay path is an optical path. In the manner (1), an underlay optical path in an IP-optical integration scenario may be described by advertising extensions of an End.X SID or an adjacency SID. Because an underlay segment identifier is advertised by using a sub-TLV of a TLV carrying an End.X SID, a correspondence between the underlay segment identifier and the End.X SID may be intuitively specified by using a parent-child relationship between the two TLVs.

Manner (2): The first TLV is a TLV parallel to a second TLV.

Alternatively, the first TLV and the second TLV may be in a parallel relationship. In other words, the two TLVs are at a same level. For example, if the second TLV is a sub-TLV of the 22 TLV of IS-IS, the first TLV may also be a sub-TLV of the 22 TLV. Alternatively, if the second TLV is a sub-TLV of the 222 TLV of IS-IS, the first TLV may also be a sub-TLV of the 222 TLV.

It should be noted that the format of the first TLV may vary on different types of networks. FIG. 8 and FIG. 9 are schematic diagrams of formats of the first TLV according to the manner (2). A difference between FIG. 8 and FIG. 9 lies in that, the first TLV shown in FIG. 8 may be used for a point-to-point link, and the first TLV shown in FIG. 9 may be used for a local area network link. In FIG. 9, a system identifier (System ID) field indicates the identifier of the second network node. A sub-sub-TLV in FIG. 8 and FIG. 9 may include a path parameter of an underlay path.

In the manner (2), an underlay segment identifier may be advertised in a scenario in which the first network node has no corresponding End.X SID.

Manner (3): The first TLV is a sub-TLV of a locator TLV

Locator and function: An SRv6 SID is in a form of an IPv6 address. The SRv6 SID may include two parts: a locator and a function. A format is locator: function. The locator occupies the most significant bits of the IPv6 address, and the function occupies the least significant bits of the IPv6 address. The locator may have a positioning function, and may be unique in SR domain. The function indicates instructions of a device. The instructions are preset by the device. The function is used to indicate an SRv6 SID generation node to perform a corresponding function operation. The locator needs to be advertised by using the IGP, and a node that receives the locator needs to generate a forwarding entry as required. Usually, in SRv6, each SID other than a SID related to a neighboring node should be advertised in the locator.

Figure 10:
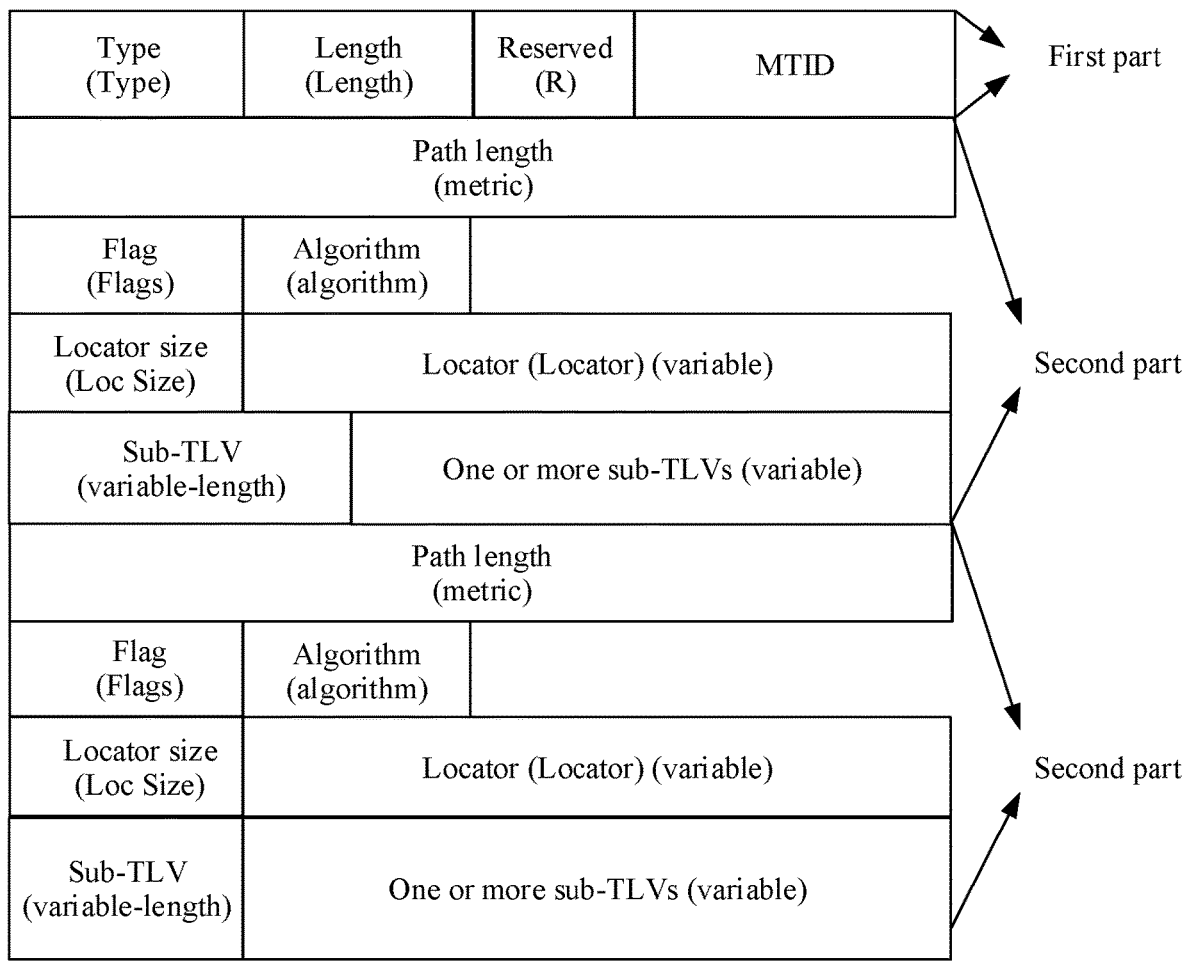
FIG. 10 is a schematic diagram of a TLV format according to an embodiment of this application.

An SRv6 locator TLV is used to advertise an SRv6 locator and a locator-related End SID. The locator TLV is a top TLV whose a type is 27. A format of the SRv6 locator TLV may be shown in FIG. 10. As shown in FIG. 10, the locator TLV may include a first part and one or more second parts. The first part is a header of the locator TLV. The second part may appear in the locator TLV once, or repeatedly appear in the locator TLV. It should be noted that FIG. 10 is drawn only by using an example in which the locator TLV includes two second parts. It should be understood that the locator TLV may include more or fewer second parts, and a quantity of second parts included in the locator TLV is not limited in this embodiment.

In the manner (3), an underlay segment identifier may be advertised in a sub-TLV of the SRv6 locator TLV. For example, referring to FIG. 11, the SRv6 locator TLV may include a sub-TLV shown in FIG. 11, and the underlay segment identifier may be carried in a SID field in FIG. 11. In a possible implementation, referring to FIG. 12, the sub-TLV of the locator may further carry a system identifier (system ID) to indicate a neighbor, and an SRV6 endpoint function should point to an allocated value of END.XU. In addition, a sub-sub-TLV in FIG. 11 and FIG. 12 may include a path parameter of an underlay path, for example, a bandwidth. In the manner (3), because the current 22 TLV is relatively complex, the underlay segment identifier is advertised in a TLV other than the 22 TLV, thereby avoiding interfering with the current 22 TLV. The underlay segment identifier may be advertised in a 27 TLV (namely, the SRv6 locator TLV). The 27 TLV is a relatively new TLV dedicated to the SRv6 network.

In the manner (3), the locator TLV may include an endpoint layer 3 cross-connect segment identifier of the first network node. In the prior art, the endpoint layer 3 cross-connect segment identifier of the first network node is usually advertised by using the 22 TLV or the 222 TLV. In the foregoing optional manner, the endpoint layer 3 cross-connect segment identifier is also advertised by using the locator TLV. Therefore, the 22 TLV or the 222 TLV may not need to carry the endpoint layer 3 cross-connect segment identifier of the first network node, thereby reducing complexity of the 22 TLV or the 222 TLV.

Manner (4): The first TLV is a sub-TLV of a new top (top) TLV

Figure 13:
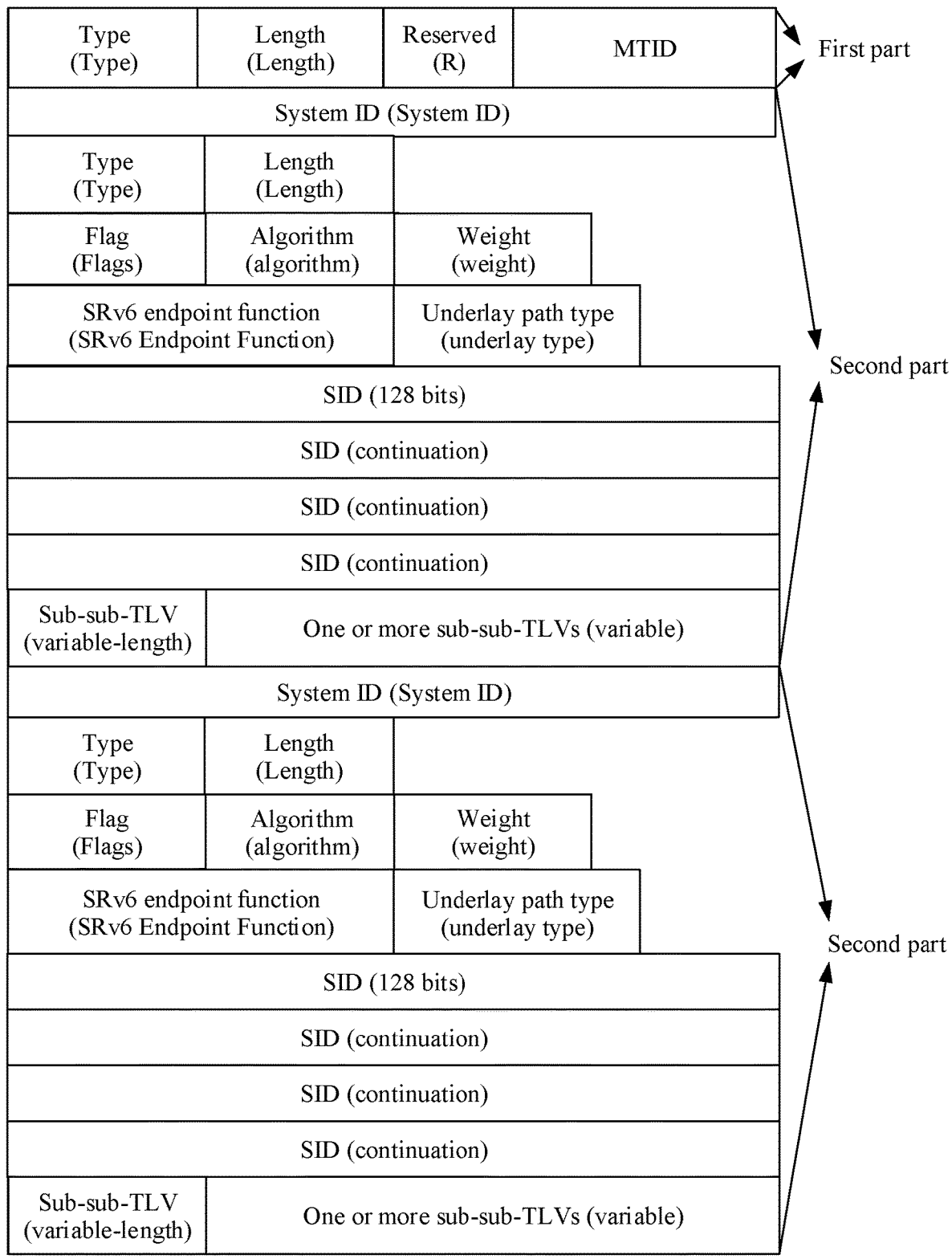
FIG. 13 is a schematic diagram of a TLV format according to an embodiment of this application.

An underlay segment identifier may be advertised in a sub-TLV of a new top TLV. A type of the top TLV is an unused new type. For example, the top TLV may be a 28 TLV, that is, a TLV whose type is 28. FIG. 13 is a schematic diagram of a format of the new top TLV. All SIDs of the first network node that are irrelevant to a neighboring node may be advertised in the 27 TLV, and all SIDs of the first network node that are related to a neighboring node may be advertised in the 28 TLV. As shown in FIG. 13, the new top TLV may include a first part and one or more second parts. The first part is a header of the new top TLV. The second part is a SID group, and the second part starts with a system ID. Each second part includes some sub-TLVs of the 28 TLV. It can be understood that the sub-TLV, namely, the first TLV, starts from a type following the system ID; or the first TLV may start from the system ID. The manner (4) is applicable to a scenario in which a large number of underlay segment identifiers are advertised. It should be noted that FIG. 13 is drawn only by using an example in which the top TLV includes two second parts. It should be understood that the top TLV may include more or fewer second parts, and a quantity of second parts included in the top TLV is not limited in this embodiment.

In the manner (4), the new top TLV may include an endpoint layer 3 cross-connect segment identifier of the first network node. In the prior art, the endpoint layer 3 cross-connect segment identifier of the first network node is usually advertised by using the 22 TLV or the 222 TLV. In the foregoing optional manner, the endpoint layer 3 cross-connect segment identifier is also advertised by using the new top TLV. Therefore, the 22 TLV or the 222 TLV may not need to carry the endpoint layer 3 cross-connect segment identifier of the first network node, thereby reducing complexity of the 22 TLV or the 222 TLV.

For example, in a BGP-LS, FIG. 14 is a schematic diagram of a format of an SRV6 End.X TLV, and FIG. 15 is a schematic diagram of a format of an SRV6 LAN End.X TLV. FIG. 14 or FIG. 15 may be extended to define a new sub-TLV. For example, a type is set to 100, to define a 100 sub-TLV. The 100 sub-TLV is the first TLV. For example, a format of the first sub-TLV may be shown in FIG. 8. Certainly, in the BGP-LS, an underlay path may be alternatively treated as a separate function similar to END.X. For example, a format of the first TLV may be shown in FIG. 8 or FIG. 9.

In addition, in a PCEP, a similar extension may be performed to carry an underlay segment identifier or other information about an underlay path. Details are not described herein in this embodiment.

It should be noted that FIG. 5 and FIG. 6 to FIG. 15 are merely schematic drawings of a packet, and a location and a length of each field shown in FIG. 5 and FIG. 6 to FIG. 15 are merely examples. It should be understood that the location and the length of each field in the packet may be adaptively changed based on an actual requirement. The location and the length of each field in the packet are not limited in this embodiment.

It should be further noted that each row of each packet included in FIG. 5 and FIG. 6 to FIG. 15 may include 32 bytes. During implementation, one or more reserved fields may be set at a vacant location of each row in the packet drawn in FIG. 5 and FIG. 6 to FIG. 15. Certainly, another field may be alternatively set. Whether the packet includes a reserved field, a location of the reserved field, and a length of the reserved field are not limited in this embodiment.

Step 402: The head node receives the at least one underlay segment identifier from the first network node.

A manner of receiving the underlay segment identifier may be but is not limited to any one of the following manner 1 to manner 3.

Manner 1: The head node may receive the at least one underlay segment identifier by using an IGP.

Specifically, after the first network node floods the at least one underlay segment identifier to the packet switched network by using the IGP, because the head node is located on the packet switched network and supports the IGP, the head node may receive the at least one underlay segment identifier by using the IGP.

The advertising manner by using the IGP can support a distributed control scenario. The distributed control scenario is a scenario in which no controller is available. For a solution in which an optical path is abstracted as a BSID and the BSID is advertised to support POI, based on a current design of the SRv6 network, the BSID can be advertised only by using a BGP-LS or a PCEP. The BGP-LS and the PCEP require a controller on the network. A POG needs to report the BSID to the controller, and the controller delivers the BSID to the head node. As a result, this solution cannot be used to support POI in the distributed control scenario. However, in this embodiment, it is not necessarily required that a controller exist on the network or a controller forward the underlay segment identifier, but the POG may directly send the underlay segment identifier to the head node by using the IGP. Therefore, this embodiment is applicable to the distributed control scenario, thereby extending an application scope and improving flexibility.

Manner 2: The head node receives the at least one underlay segment identifier by using a BGP-LS.

Specifically, the controller may send the at least one underlay segment identifier to the head node by using the BGP-LS, and the head node may receive, by using the BGP-LS, the at least one underlay segment identifier sent by the controller.

Manner 3: The head node may receive the at least one underlay segment identifier by using a PCEP.

Specifically, the controller may send the at least one underlay segment identifier to the head node by using the PCEP, and the head node may receive, by using the PCEP, the at least one underlay segment identifier sent by the controller.

For a specific process of receiving the underlay segment identifier, in some possible embodiments, the head node may receive a packet from the first network node, and obtain the at least one underlay segment identifier from at least one first TLV in the packet. If the packet includes a plurality of first TLVs, one underlay segment identifier may be obtained from each first TLV. For example, the head node may read an End.XU function field of the first TLV, and determine, based on a value of the End.XU function field, that a value of a SID field is an underlay segment identifier. In this case, the head node reads the value of the SID field, and uses the value of the SID field as the underlay segment identifier.

Specifically, corresponding to the manner (1) of advertising the underlay segment identifier, the head node may obtain the underlay segment identifier from the sub-TLV of the second TLV; corresponding to the manner (2) of advertising the underlay segment identifier, the head node may obtain the underlay segment identifier from the TLV parallel to the second TLV; corresponding to the manner (3) of advertising the underlay segment identifier, the head node may obtain the underlay segment identifier from the sub-TLV of the locator TLV; and corresponding to the manner (4) of advertising the underlay segment identifier, the head node may obtain the underlay segment identifier from the top TLV.

After receiving the at least one underlay segment identifier, the head node may store the at least one underlay segment identifier, to subsequently add the underlay segment identifier to a data packet. Optionally, the head node may further receive the path parameter of the one or more of the at least one underlay path from the first network node, and store the path parameter of the one or more underlay paths. The head node may further receive the identifier of the second network node from the first network node, and store the identifier of the second network node.

Step 403: The head node receives a data packet.

Step 404: The head node adds a target underlay segment identifier to the data packet.

For a purpose of differentiated description, an underlay segment identifier added to the data packet is referred to as the target underlay segment identifier herein, and the target underlay segment identifier may be any one of the at least one underlay segment identifier.

Specifically, step 404 may be but is not limited to any one of the following manner 1 and manner 2.

Manner 1: The head node may determine a service carried in the data packet, and select, from the at least one underlay path based on the service carried in the data packet, an underlay path corresponding to the service. The head node may use an underlay segment identifier corresponding to the selected underlay path as the target underlay segment identifier, and add the target underlay segment identifier to the data packet.

An underlay path for transmitting a data packet is selected based on a service carried in the data packet. For any service, an underlay path through which a data packet carrying the service is to pass may be specified, so that different services can be transmitted through different underlay paths to facilitate traffic planning, and different underlay paths can be better utilized to improve quality of service (QoS) of a service. The head node may select one underlay path, or may select a plurality of underlay paths, so that the plurality of underlay paths share load. A quantity of selected underlay paths is not limited in this embodiment.

For a specific manner of selecting an underlay path, in some possible embodiments, the head node may select, from the at least one underlay path based on a path parameter of each underlay path, an underlay path whose path parameter meets a transmission requirement of the service. The transmission requirement of the service may be a latency requirement, a bandwidth requirement, or the like. For example, if the latency requirement of the service carried in the data packet is that a latency is less than n milliseconds, the head node may select, from the at least one underlay path based on a latency of each underlay path, an underlay path whose latency is less than n milliseconds. If the bandwidth requirement of the service carried in the data packet is that a bandwidth is greater than m Mbps, the head node may select, from the at least one underlay path based on a bandwidth of each underlay path, an underlay path whose bandwidth is greater than m Mbps. n and m are positive integers.

Manner 2: The head node receives the target underlay segment identifier from the controller of the segment routing network, and adds the target underlay segment identifier to the data packet.

A difference from the manner 1 lies is that the target underlay segment identifier may not be selected by the head node, but selected by the controller. Specifically, the controller may determine a service carried in the data packet, and select, from the at least one underlay path based on the service carried in the data packet, an underlay path corresponding to the service. The controller may send, to the head node, a target underlay segment identifier corresponding to the selected underlay path. The head node may receive the target underlay segment identifier. A specific manner of selecting the underlay path by the controller may be the same as that of selecting the underlay path by the head node. Details are not described herein again.

Step 405: The head node sends the data packet carrying the target underlay segment identifier to the first network node.

Step 406: The first network node receives the data packet carrying the target underlay segment identifier.

Step 407: The first network node sends the data packet through an underlay path, corresponding to the target underlay segment identifier, of the at least one underlay path.

The first network node may obtain the target underlay segment identifier from the data packet; determine, based on the target underlay segment identifier and a correspondence between an underlay segment identifier and an underlay path, one or more underlay paths corresponding to the target underlay segment identifier; and send the data packet through the one or more underlay paths. If the target underlay segment identifier corresponds to a plurality of underlay paths, the first network node may send different data packets through different underlay paths of the plurality of underlay paths, to share load.

For example, referring to FIG. 1 and Table 1, if the underlay segment identifier carried in the data packet is the End.XU SID 1, P2 may determine the underlay path (O1, O2, O3, O4) based on the correspondence shown in Table 1, and send the data packet through (O1, O2, O3, O4). If the underlay segment identifier carried in the data packet is the End.XU SID 4, P2 may determine the underlay path (O1, O2, O3, O4) and the underlay path (O2, O3) based on the correspondence shown in Table 1, and send the data packet through the underlay path (O1, O2, O3, O4) and the underlay path (O2, O3).

In some possible embodiments, the first network node may obtain the target underlay segment identifier from the data packet. The first network node may determine, based on the target underlay segment identifier and a binding relationship, an underlay outbound interface to which the target underlay segment identifier is bound, and send the data packet through the underlay outbound interface.

For example, if the underlay segment identifier carried in the data packet is the End.XU SID 2, P2 may determine, based on the binding relationship shown in Table 2, that an underlay outbound interface is the virtual interface 3, and send the data packet through the virtual interface 3, so that the data packet is transmitted through one underlay path. If the underlay segment identifier carried in the data packet is the End.XU SID 1, P2 may determine, based on the binding relationship shown in Table 2, that underlay outbound interfaces are the virtual interface 1 and the virtual interface 2, and send the data packet through the virtual interface 1 or the virtual interface 2, so that the data packet is transmitted through one of two underlay paths.

The first network node may perform longest matching between the underlay segment identifier and a segment identifier in the local segment identifier table. When a longest match is found between the underlay segment identifier and any segment identifier in the local segment identifier table, the data packet is sent through an underlay outbound interface bound to the underlay segment identifier.

Step 408: The second network node receives the data packet.

After receiving the data packet, the second network node may continue to send the data packet to another network node on the segment routing network based on the segment identifier in the data packet, until the data packet arrives at a destination node. For example, referring to FIG. 1, after receiving the data packet from P2, P3 may send the data packet to P4.

In the method provided in this embodiment, an underlay segment identifier corresponding to an underlay path is designed, and the underlay segment identifier is advertised, so that a node on the SRv6 network can sense the underlay path by using the underlay segment identifier. In this way, when a data packet is transmitted, the data packet can be sent based on an underlay segment identifier carried in the data packet and through an underlay path corresponding to the underlay segment identifier. Therefore, an underlay path through which a data packet is to be transmitted may be specified based on a service requirement, so that different data packets can be transmitted through different underlay paths, thereby improving flexibility and facilitating traffic planning. Particularly, when the underlay path is an optical path, by advertising the underlay segment identifier, the node on the SRv6 network can sense each optical path by using the underlay segment identifier, so that a POI scenario is supported, and an optical path for transmitting traffic can be flexibly selected as required.

The foregoing describes the data transmission method in the embodiments of this application. The following describes the first network node and the head node provided in the embodiments of this application.

Figure 16:
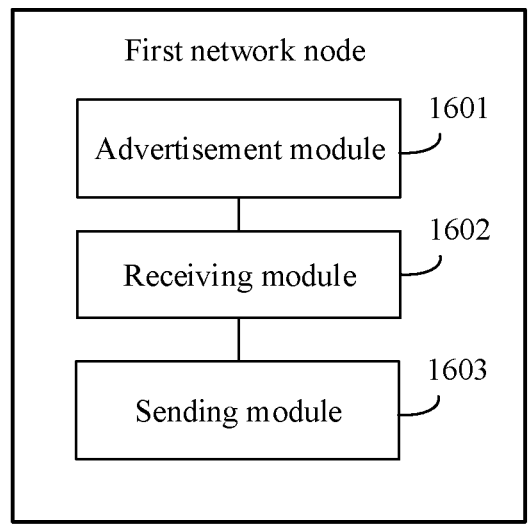
FIG. 16 is a schematic structural diagram of a first network node according to an embodiment of this application.

FIG. 16 is a schematic structural diagram of a first network node according to an embodiment of this application. As shown in FIG. 16, the first network node includes: an advertisement module 1601, configured to perform step 401; a receiving module 1602, configured to perform step 406; and a sending module 1603, configured to perform step 407.

Optionally, one or more of the at least one underlay segment identifier is an underlay link segment identifier.

Optionally, one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the advertisement module 1601 is configured to advertise at least two underlay segment identifiers. The at least two underlay segment identifiers correspond to one endpoint layer 3 cross-connect segment identifier. The endpoint layer 3 cross-connect segment identifier is used to identify a layer 3 adjacency between the first network node and a second network node.

Optionally, the one or more of the at least one underlay segment identifier has no corresponding endpoint layer 3 cross-connect segment identifier, and the endpoint layer 3 cross-connect segment identifier is used to identify a layer 3 adjacency between the first network node and a second network node.

Optionally, the advertisement module 1601 is specifically configured to: advertise the at least one underlay segment identifier by using an IGP; or advertise the at least one underlay segment identifier by using a BGP-LS; or advertise the at least one underlay segment identifier by using a PCEP.

Optionally, the advertisement module 1601 is further configured to advertise a path parameter of the one or more of the at least one underlay path.

Optionally, the advertisement module 1601 is further configured to advertise an identifier of the second network node.

Optionally, the at least one underlay segment identifier is carried in a packet, the packet includes at least one first type-length-value TLV, and each first TLV includes one underlay segment identifier.

Optionally, the sending module 1601 is further configured to advertise a path parameter of the one or more of the at least one underlay path.

Optionally, the first TLV is a sub-TLV of a second TLV, and the second TLV includes the endpoint layer 3 cross-connect segment identifier; or the first TLV is a TLV parallel to the second TLV; or the first TLV is a sub-TLV of a locator TLV; or the first TLV is a sub-TLV of a new top TLV, and the top TLV is a TLV not nested in another TLV.

Optionally, the first TLV further includes each segment identifier, related to a neighboring node, of the first network node.

Optionally, the first network node further includes an allocation module, configured to allocate the at least one underlay segment identifier to the at least one underlay path; or the receiving module 1602 is further configured to receive a configuration instruction, and obtain, from the configuration instruction, a correspondence between the at least one underlay segment identifier and the one or more of the at least one underlay path.

Optionally, the first network node further includes a storage module, configured to store a binding relationship between an underlay segment identifier and an underlay outbound interface; and the sending module 1603 is specifically configured to determine, based on the target underlay segment identifier and the binding relationship, an underlay outbound interface bound to the target underlay segment identifier, and send the data packet through the underlay outbound interface.

It should be noted that, when the first network node provided in the embodiment of FIG. 16 transmits data, the division of the foregoing function modules is merely used as an example for description. In actual application, the foregoing functions may be allocated to and performed by different function modules as required. To be specific, an inner structure of the first network node is divided into different function modules to perform all or some of the foregoing functions. In addition, the first network node provided in the foregoing embodiment and the embodiment of the data transmission method belong to a same concept. For details about a specific implementation process of the first network node, refer to the method embodiment. Details are not described herein again.

Figure 17:
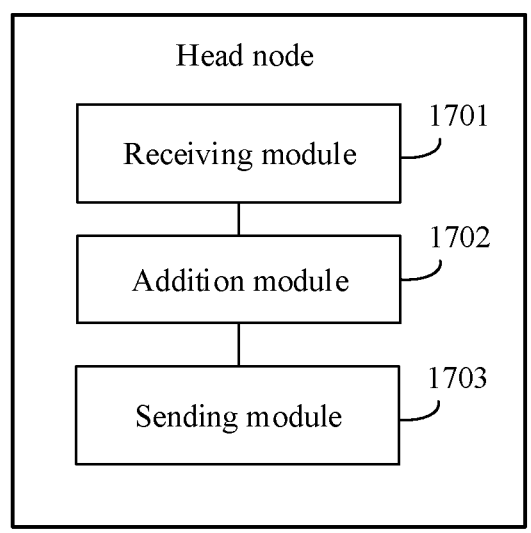
FIG. 17 is a schematic structural diagram of a head node according to an embodiment of this application.

FIG. 17 is a schematic structural diagram of a head node according to an embodiment of this application. As shown in FIG. 17, the head node includes: a receiving module 1701, configured to perform step 402 and step 403; an addition module 1702, configured to perform step 404; and a sending module 1703, configured to perform step 405.

Optionally, one or more of the at least one underlay segment identifier is an underlay link segment identifier.

Optionally, one or more of at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the apparatus further includes a selection module, configured to perform the manner 1 in step 404; or the receiving module is further configured to perform the manner 2 in step 404.

Optionally, the selection module is further configured to select, from the at least one underlay path based on a path parameter of each underlay path, an underlay path whose path parameter meets a transmission requirement of the service.

Optionally, the receiving module 1701 is further configured to receive a path parameter of the one or more of the at least one underlay path from the first network node.

Optionally, the receiving module 1701 is further configured to receive an identifier of a second network node from the first network node.

Optionally, the receiving module 1701 is further configured to receive a path type of the one or more of the at least one underlay path from the first network node.

It should be noted that, when the head node provided in the embodiment of FIG. 17 transmits data, the division of the foregoing function modules is merely used as an example for description. In actual application, the foregoing functions may be allocated to and performed by different function modules as required. To be specific, an inner structure of the head node is divided into different function modules to perform all or some of the foregoing functions. In addition, the head node provided in the foregoing embodiment and the embodiment of the data transmission method belong to a same concept. For details about a specific implementation process of the head node, refer to the method embodiment. Details are not described herein again.

All of the foregoing optional technical solutions may be combined in any manner to form an optional embodiment of this application. Details are not described herein.

The foregoing describes the first network node and the head node in the embodiments of this application. The following describes possible product forms of the first network node and the head node. It should be understood that any product form with the features of the first network node in FIG. 16 and any product form with the features of the head node in FIG. 17 fall within the protection scope of this application. It should be further understood that the following descriptions are merely examples, and product forms of the first network node and the head node in the embodiments of this application are not limited thereto.

In a possible product form, the first network node or the head node provided in the embodiments of this application may be implemented by a general bus system structure.

Figure 18:
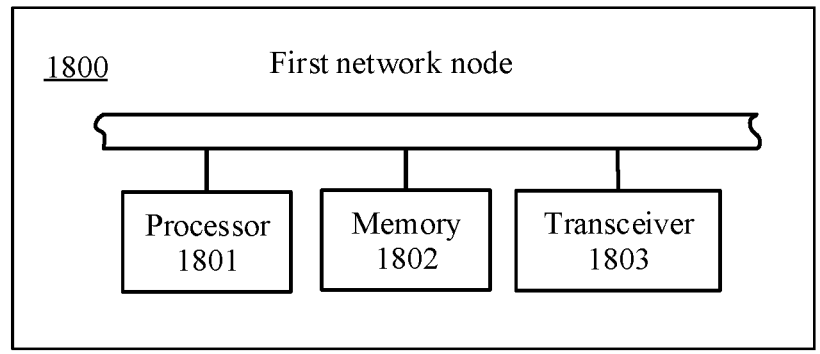
FIG. 18 is a schematic structural diagram of a first network node according to an embodiment of this application.

As shown in FIG. 18, an embodiment of this application provides a first network node. The first network node 1800 includes a processor 1801, a memory 1802, and a transceiver 1803. The memory 1802 stores at least one instruction. The processor 1801, the memory 1802, and the transceiver 1803 may be connected through a bus.

The processor 1801 is configured to control, by using the instruction, the transceiver 1803 to perform step 401, step 406, and step 407.

Optionally, one or more of the at least one underlay segment identifier is an underlay link segment identifier.

Optionally, one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processor 1801 is further configured to control, by using the instruction, the transceiver 1803 to advertise a path parameter of the one or more of the at least one underlay path.

Optionally, the processor 1801 is further configured to control, by using the instruction, the transceiver 1803 to advertise an identifier of a second network node.

Optionally, the processor 1801 is further configured to control, by using the instruction, the transceiver 1803 to advertise a path type of the one or more of the at least one underlay path.

Optionally, the processor 1801 is specifically configured to control, by using the instruction, the transceiver 1803 to send a packet. The packet includes at least one first type-length-value TLV, and each first TLV includes one underlay segment identifier.

Optionally, the first TLV is a sub-TLV of a second TLV, and the second TLV includes the endpoint layer 3 cross-connect segment identifier; or the first TLV is a TLV parallel to the second TLV; or the first TLV is a sub-TLV of a locator TLV; or the first TLV is a sub-TLV of a new top TLV.

Optionally, the processor 1801 is configured to allocate the at least one underlay segment identifier to the at least one underlay path by using the instruction; or the processor 1801 is further configured to control, by using the instruction, the transceiver 1803 to receive a configuration instruction, and obtain, from the configuration instruction, a correspondence between the at least one underlay segment identifier and the one or more of the at least one underlay path.

Optionally, the processor 1801 is further configured to control, by using the instruction, the memory 1802 to store a binding relationship between an underlay segment identifier and an underlay outbound interface. The processor 1801 is further configured to determine, by using the instruction and based on the target underlay segment identifier and the binding relationship, an underlay outbound interface bound to the target underlay segment identifier. The processor 1801 is configured to control, by using the instruction, the transceiver 1803 to send the data packet through the underlay outbound interface.

The processor 1801 may be a general-purpose central processing unit (CPU), an application-specific integrated circuit (ASIC), or one or more integrated circuits configured to control execution of programs of the solutions of this application.

The memory 1802 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein.

Figure 19:
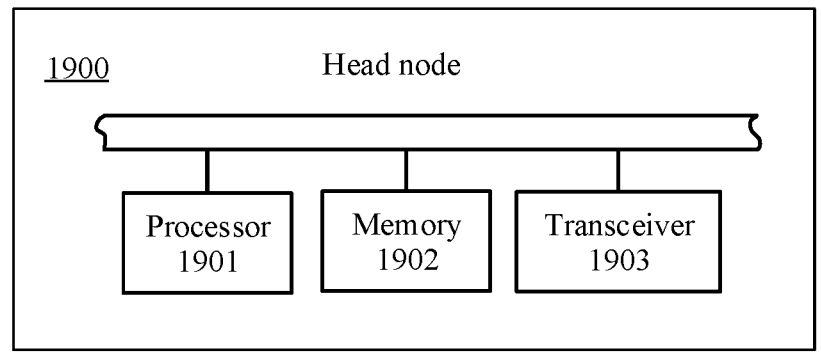
FIG. 19 is a schematic structural diagram of a head node according to an embodiment of this application.

As shown in FIG. 19, an embodiment of this application provides a head node. The head node 1900 includes a processor 1901, a memory 1902, and a transceiver 1903. The memory 1902 stores at least one instruction. The processor 1901, the memory 1902, and the transceiver 1903 may be connected through a bus. A product form of the processor 1901 is the same as that of the processor 1801, and a product form of the memory 1902 is the same as that of the memory 1802. Details are not described herein again.

The processor 1901 is configured to load the instruction to control the transceiver 1903 to perform step 402, step 403, and step 405. The processor 1901 is further configured to perform step 404 by using the instruction.

Optionally, one or more of the at least one underlay segment identifier is an underlay link segment identifier.

Optionally, one or more of at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processor 1901 is further configured to perform the manner 1 in step 404 by using the instruction; or the processor 1901 is further configured to control, by using the instruction, the transceiver 1903 to perform the manner 2 in step 404.

Optionally, the processor 1901 is specifically configured to select, by using the instruction from the at least one underlay path based on a path parameter of each underlay path, an underlay path whose path parameter meets a transmission requirement of the service.

Optionally, the processor 1901 is further configured to control, by using the instruction, the transceiver 1903 to receive a path parameter of the one or more of the at least one underlay path from the first network node.

Optionally, the processor 1901 is further configured to control, by using the instruction, the transceiver 1903 to receive an identifier of a second network node from the first network node.

Optionally, the processor 1901 is further configured to control, by using the instruction, the transceiver 1903 to receive a path type of the one or more of the at least one underlay path.

In a possible product form, the first network node or the head node provided in the embodiments of this application may be implemented by a general-purpose processor.

The general-purpose processor for implementing the first network node includes a processing circuit, and an output interface and an input interface that are internally connected to and communicate with the processing circuit. The processing circuit is configured to control the output interface to perform step 401. The processing circuit is configured to control the input interface to perform step 406. The processing circuit is further configured to control the output interface to perform step 407. Optionally, the general-purpose processor may further include a storage medium, and the storage medium is configured to store an instruction to be executed by the processing circuit.

Optionally, the one or more of the at least one underlay segment identifier is an underlay link segment identifier.

Optionally, one or more of the at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processing circuit is further configured to control, by using the instruction, the output interface to advertise a path parameter of the one or more of the at least one underlay path.

Optionally, the processing circuit is further configured to control, by using the instruction, the output interface to advertise an identifier of a second network node.

Optionally, the processing circuit is further configured to control, by using the instruction, the output interface to advertise a path type of the one or more of the at least one underlay path.

Optionally, the processing circuit is specifically configured to control, by using the instruction, the output interface to send a packet. The packet includes at least one first type-length-value TLV, and each first TLV includes one underlay segment identifier.

Optionally, the first TLV is a sub-TLV of a second TLV, and the second TLV includes the endpoint layer 3 cross-connect segment identifier; or the first TLV is a TLV parallel to the second TLV; or the first TLV is a sub-TLV of a locator TLV; or the first TLV is a sub-TLV of a new top TLV.

Optionally, the processing circuit is configured to allocate the at least one underlay segment identifier to the at least one underlay path by using the instruction; or the processing circuit is further configured to control, by using the instruction, the input interface to receive a configuration instruction, and obtain, from the configuration instruction, a correspondence between the at least one underlay segment identifier and the one or more of the at least one underlay path.

Optionally, the processing circuit is further configured to control, by using the instruction, the storage medium to store a binding relationship between an underlay segment identifier and an underlay outbound interface. The processing circuit is further configured to determine, by using the instruction and based on the target underlay segment identifier and the binding relationship, an underlay outbound interface bound to the target underlay segment identifier. The processing circuit is configured to control, by using the instruction, the output interface to send the data packet through the underlay outbound interface.

The general-purpose processor for implementing the head node includes a processing circuit, and an input interface and an output interface that are internally connected to and communicate with the processing circuit. The processing circuit is configured to control the input interface to perform step 402 and step 403. The processing circuit performs step 404. The processing circuit is configured to control the output interface to perform step 405. Optionally, the general-purpose processor may further include a storage medium, and the storage medium is configured to store an instruction to be executed by the processing circuit.

Optionally, one or more of the at least one underlay segment identifier is an underlay link segment identifier.

Optionally, one or more of at least one underlay path is an optical path, an ATM path, an FR path, a back-to-back Ethernet path, a GRE tunnel, a FlexE path, an MPLS RSVP-TE tunnel, an IP tunnel, or a UDP tunnel.

Optionally, the processing circuit is further configured to perform the manner 1 in step 404 by using the instruction; or the processing circuit is further configured to control, by using the instruction, the input interface to perform the manner 2 in step 404.

Optionally, the processing circuit is specifically configured to select, by using the instruction from the at least one underlay path based on a path parameter of each underlay path, an underlay path whose path parameter meets a transmission requirement of the service.

Optionally, the processing circuit is further configured to control, by using the instruction, the input interface to receive a path parameter of the one or more of the at least one underlay path from the first network node.

Optionally, the processing circuit is further configured to control, by using the instruction, the input interface to receive an identifier of a second network node from the first network node.

Optionally, the processing circuit is further configured to control, by using the instruction, the input interface to receive a path type of the one or more of the at least one underlay path.

In a possible product form, the first network node or the head node in the embodiments of this application may be alternatively implemented by using the following: one or more field-programmable gate arrays (FPGA), a programmable logic device (PLD), a controller, a state machine, a gate logic, a discrete hardware component, any other suitable circuit, or any combination of circuits capable of performing various functions described throughout this application.

It should be understood that the first network node or the head node in the foregoing product forms has any function of the first network node or the head node in the foregoing method embodiment respectively. Details are not described herein again.

A person of ordinary skill in the art may be aware that the method steps and units described with reference to the embodiments disclosed in this specification can be implemented by electronic hardware, computer software, or a combination thereof. To clearly describe interchangeability between hardware and software, the steps and compositions of the embodiments are generally described based on functions in the foregoing descriptions. Whether these functions are performed by hardware or software depends on particular applications and design constraints of the technical solutions. A person of ordinary skill in the art may use different methods to implement the described functions for each particular application, but it should not be considered that the implementation goes beyond the scope of this application.

It can be clearly understood by a person skilled in the art that, for convenience and brevity of description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division, and there may be other division in actual implementation. For example, a plurality of units or components may be combined or integrated into another system, or some features may be ignored or not performed. In addition, the shown or discussed mutual couplings or direct couplings or communication connections may be implemented by using some interfaces. Alternatively, the indirect couplings or communication connections between the apparatuses or units may be implemented in electrical, mechanical, or other forms.

The units described as separate parts may or may not be physically separated, and parts shown as units may or may not be physical units, and may be located in one place, or may be distributed on a plurality of network units. Some or all of the units may be selected based on actual requirements to achieve the objectives of the solutions of the embodiments of this application.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a computer software product. The computer software product is stored in a storage medium and includes several instructions for instructing a computer device (which may be a personal computer, a server, a network device, or the like) to perform all or some of the steps of the method in the embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by software, hardware, firmware, or any combination thereof. When software is used to implement the embodiments, some or all of the embodiments may be implemented in a form of a computer program product. The computer program product includes one or more computer program instructions. When the computer program instructions are loaded and executed on a computer, all or some of the processes or functions according to the embodiments of this application are generated. The computer may be a general-purpose computer, a dedicated computer, a computer network, or another programmable apparatus. The computer program instructions may be stored in a computer-readable storage medium, or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art can understand that all or some of the steps in the foregoing embodiments may be implemented by hardware or by a program instructing related hardware. The program may be stored in a computer-readable storage medium. The aforementioned storage medium may be a read-only memory, a magnetic disk, or an optical disc.

The foregoing descriptions are merely optional embodiments of this application, but are not intended to limit this application. Any modification, equivalent replacement, or improvement made within the principle of this application shall fall within the protection scope of this application.

What is claimed is:

1. A data transmission method, comprising:
    advertising, by a first network node, at least one underlay segment identifier, wherein each underlay segment identifier corresponds to one or more of at least one underlay path, and wherein the first network node is coupled with a second network node through the at least one underlay path, the underlay path is a data link layer path, a physical layer path, or a path constructed using a tunneling technology;
    receiving, by the first network node, a data packet carrying a target underlay segment identifier, wherein the target underlay segment identifier is any one of the at least one underlay segment identifier, and the target underlay segment identifier for the data packet is: (i) a selection, by a head node of a segment routing network, from the at least one underlay path based on a service carried in the data packet, of an underlay path corresponding to the service, where an underlay segment identifier corresponding to the selected underlay path is used as the target underlay segment identifier, or (ii) a selection, by a controller of the segment routing network, of the target underlay segment identifier; and
    sending, by the first network node to the second network node, the data packet through the underlay path, corresponding to the target underlay segment identifier, of the at least one underlay path.

2. The method according to claim 1, wherein one or more of the at least one underlay segment identifier is an underlay link segment identifier.

3. The method according to claim 1, wherein the one or more of the at least one underlay path is an optical path, an asynchronous transfer mode (ATM) path, a frame relay (FR) path, a back-to-back Ethernet path, a generic routing encapsulation (GRE) tunnel, a flexible Ethernet path, a multiprotocol label switching (MPLS) resource reservation protocol-traffic engineering (RSVP-TE) tunnel, an IP tunnel, or a user datagram protocol (UDP) tunnel.

4. The method according to claim 1, wherein the advertising at least one underlay segment identifier comprises:
    advertising at least two underlay segment identifiers, wherein the at least two underlay segment identifiers correspond to one endpoint layer 3 cross-connect segment identifier, and the endpoint layer 3 cross-connect segment identifier identifies a layer 3 adjacency between the first network node and the second network node.

5. The method according to claim 1, wherein the one or more of the at least one underlay segment identifier has no corresponding endpoint layer 3 cross-connect segment identifier, and the endpoint layer 3 cross-connect segment identifier identifies a layer 3 adjacency between the first network node and the second network node.

6. The method according to claim 1, wherein the advertising at least one underlay segment identifier comprises:
advertising the at least one underlay segment identifier using an interior gateway protocol (IGP); or
advertising the at least one underlay segment identifier using a border gateway protocol-link state (BGP-LS); or
advertising the at least one underlay segment identifier by using a path computation element protocol (PCEP).

7. The method according to claim 1, wherein the method further comprises:
advertising a path parameter of the one or more of the at least one underlay path.

8. The method according to claim 1, wherein the method further comprises:
advertising an identifier of the second network node.

9. The method according to claim 1, wherein the method further comprises:
advertising a path type of the one or more of the at least one underlay path.

10. The method according to claim 1, wherein before the advertising at least one underlay segment identifier, the method further comprises:
allocating the at least one underlay segment identifier to the at least one underlay path; or
receiving a configuration instruction, and obtaining, from the configuration instruction, a correspondence between the at least one underlay segment identifier and the one or more of the at least one underlay path.

11. The method according to claim 1, wherein the method further comprises:
storing a binding relationship between an underlay segment identifier and an underlay outbound interface; and
the sending the data packet through the underlay path, corresponding to the target underlay segment identifier, of the at least one underlay path comprises:
determining, based on the target underlay segment identifier and the binding relationship, an underlay outbound interface bound to the target underlay segment identifier, and sending the data packet through the underlay outbound interface.

12. A data transmission method, comprising:
receiving, by a head node, at least one underlay segment identifier from a first network node, the head node is a node at an ingress of a segment routing network, wherein the first network node is connected to a second network node through at least one underlay path, the underlay path is a data link layer path, a physical layer path, or a path constructed by using a tunneling technology, and each underlay segment identifier corresponds to one or more of the at least one underlay path;
receiving, by the head node, a data packet;
obtaining, by the head node, a target underlay segment identifier for the data packet, wherein the target underlay segment identifier is any one of the at least one underlay segment identifier, and the obtaining comprises:
selecting, from the at least one underlay path based on a service carried in the data packet, an underlay path corresponding to the service, and using an underlay segment identifier corresponding to the selected underlay path as the target underlay segment identifier, or
receiving the target underlay segment identifier from a controller of the segment routing network;
adding, by the head node, the target underlay segment identifier to the data packet; and
sending, by the head node, the data packet carrying the target underlay segment identifier to the first network node.

13. The method according to claim 12, wherein one or more of the at least one underlay segment identifier is an underlay link segment identifier.

14. The method according to claim 12, wherein the one or more of the at least one underlay path is an optical path, an asynchronous transfer mode (ATM) path, a frame relay (FR) path, a back-to-back Ethernet path, a generic routing encapsulation (GRE) tunnel, a flexible Ethernet path, a multiprotocol label switching (MPLS) resource reservation protocol-traffic engineering (RSVP-TE) tunnel, an IP tunnel, or a user datagram protocol (UDP) tunnel.

15. A first network node, comprising:
at least one processor; and
one or more memories coupled to the at least one processor and storing instructions for execution by the at least one processor, the instructions instruct the at least one processor to cause the first network node to:
advertise at least one underlay segment identifier, wherein each underlay segment identifier corresponds to one or more of at least one underlay path,
receive a data packet carrying a target underlay segment identifier, wherein the target underlay segment identifier is any one of the at least one underlay segment identifier, and the target underlay segment identifier for the data packet is: (i) a selection, by a head node of a segment routing network, from the at least one underlay path based on a service carried in the data packet, of an underlay path corresponding to the service, where an underlay segment identifier corresponding to the selected underlay path is used as the target underlay segment identifier, or (ii) a selection, by a controller of the segment routing network, of the target underlay segment identifier, and
send the data packet through the underlay path to a second network node, corresponding to the target underlay segment identifier, of the at least one underlay path, wherein
the first network node is connected to the second network node through the at least one underlay path, and the underlay path is a data link layer path, a physical layer path, or a path constructed by using a tunneling technology.

16. The first network node according to claim 15, wherein one or more of the at least one underlay segment identifier is an underlay link segment identifier.

17. A head node, comprising:
at least one processor; and
one or more memories coupled to the at least one processor and storing instructions for execution by the at least one processor, the instructions instruct the at least one processor to cause the head node to:
receive at least one underlay segment identifier from a first network node, the head node is a node at an ingress of a segment routing network, wherein the first network node is connected to a second network node through at least one underlay path, the underlay path is a data link layer path, a physical layer path, or a path constructed by using a tunneling technology, and each underlay segment identifier corresponds to one or more of the at least one underlay path,
receive a data packet,
obtain a target underlay segment identifier for the data packet, wherein the target underlay segment identifier is any one of the at least one underlay segment identifier, and the target underlay segment identifier is obtained by:
  selecting, from the at least one underlay path based on a service carried in the data packet, an underlay path corresponding to the service, and using an underlay segment identifier corresponding to the selected underlay path as the target underlay segment identifier, or
  receiving the target underlay segment identifier from a controller of the segment routing network;
add the target underlay segment identifier to the data packet, and
send the data packet carrying the target underlay segment identifier to the first network node.

18. The head node according to claim 17, wherein the instructions further instruct the at least one processor to cause the head node to:
  select, from the at least one underlay path based on a path parameter of each underlay path, an underlay path whose path parameter meets a transmission requirement of the service.

\* \* \* \* \*